US007951002B1

(12) United States Patent
Brosnan

(10) Patent No.: US 7,951,002 B1
(45) Date of Patent: May 31, 2011

(54) USING A GAMING MACHINE AS A SERVER

(75) Inventor: William J. Brosnan, Reno, NV (US)

(73) Assignee: IGT, Reno, NV (US)

( * ) Notice: Subject to any disclaimer, the term of this patent is extended or adjusted under 35 U.S.C. 154(b) by 869 days.

(21) Appl. No.: 09/595,798

(22) Filed: Jun. 16, 2000

(51) Int. Cl.
*A63F 13/00* (2006.01)

(52) U.S. Cl. ................ 463/42; 463/27; 463/29; 463/40; 463/41; 463/43

(58) Field of Classification Search .............. 463/40-43, 463/16-22, 12-13, 25, 29, 27; 273/138.1
See application file for complete search history.

(56) References Cited

U.S. PATENT DOCUMENTS 3,931,504 A 1/1976 Jacoby
4,072,930 A 2/1978 Lucero et al.
4,335,809 A 6/1982 Wain
4,430,728 A 2/1984 Beitel et al.
4,454,594 A 6/1984 Heffron et al.
4,468,750 A 8/1984 Chamoff et al.
4,532,416 A 7/1985 Berstein
4,572,509 A 2/1986 Sitrick
4,607,844 A 8/1986 Fullerton
4,652,998 A 3/1987 Koza et al.
4,689,742 A 8/1987 Troy et al.
4,856,787 A 8/1989 Itkis .............................. 273/237
4,868,900 A 9/1989 McGuire
5,103,079 A 4/1992 Barakai et al.
5,136,644 A 8/1992 Audebert et al.
5,149,945 A 9/1992 Johnson et al.
5,155,837 A 10/1992 Liu et al.
5,265,874 A 11/1993 Dickinson et al.
5,286,062 A 2/1994 Greenwood et al.
5,290,033 A 3/1994 Bittner et al.
5,342,047 A 8/1994 Heidel et al.
5,348,299 A 9/1994 Clapper, Jr.
(Continued)

FOREIGN PATENT DOCUMENTS

AU 199650576 4/1997
(Continued)

OTHER PUBLICATIONS

Spielo Gaming International, www.spielo.com, Dec. 6, 2000.
(Continued)

*Primary Examiner* — David L Lewis
*Assistant Examiner* — William H McCulloch
(74) *Attorney, Agent, or Firm* — Weaver Austin Villeneuve & Sampson LLP

(57) ABSTRACT

A disclosed gaming machine provides a game server. The game server may be used to provide a number of game services, including accounting, bonus game play, progressive game play, game serving and game configuration, to a group of gaming machine connected in a network The gaming machines can employ a number of standard components including a game server, a concentrator, and a translator. The concentrator gathers game information from a number of gaming machines connected in a network segment. The translator may be used to convert one communication protocol to another communication protocol for the transmission of game information. The game information may be utilized by the game server to provide a game service. When used for game serving, the game server may allow a player to select a game from a list of games stored on the game server on one gaming machine for game play on another gaming machine.

20 Claims, 7 Drawing Sheets

U.S. PATENT DOCUMENTS

| | | | | |
|---|---|---|---|---|
| 5,397,125 | A | 3/1995 | Adams | |
| 5,410,703 | A | 4/1995 | Nilsson et al. | |
| 5,421,009 | A | 5/1995 | Platt | |
| 5,421,017 | A | 5/1995 | Scholz et al. | |
| 5,466,920 | A | 11/1995 | Nair et al. | |
| 5,473,772 | A | 12/1995 | Halliwell et al. | |
| 5,487,544 | A | 1/1996 | Clapper, Jr. | |
| 5,489,096 | A | 2/1996 | Aron | |
| 5,491,812 | A | 2/1996 | Pisello et al. | |
| 5,555,418 | A | 9/1996 | Nilsson et al. | |
| 5,609,337 | A | 3/1997 | Clapper, Jr. | |
| 5,611,730 | A * | 3/1997 | Weiss | 463/20 |
| 5,643,086 | A | 7/1997 | Alcorn et al. | 463/29 |
| 5,645,485 | A | 7/1997 | Clapper, Jr. | |
| 5,647,592 | A | 7/1997 | Gerow | |
| 5,654,746 | A | 8/1997 | McMullan, Jr. et al. | |
| 5,655,961 | A * | 8/1997 | Acres et al. | 463/25 |
| 5,671,412 | A | 9/1997 | Christiano | |
| 5,682,533 | A | 10/1997 | Siljestroemer | |
| 5,688,174 | A * | 11/1997 | Kennedy | 463/37 |
| 5,702,304 | A | 12/1997 | Acres et al. | 463/29 |
| 5,715,403 | A | 2/1998 | Stefik | |
| 5,715,462 | A | 2/1998 | Iwamoto et al. | |
| 5,741,183 | A | 4/1998 | Acres et al. | 463/42 |
| 5,749,784 | A | 5/1998 | Clapper, Jr. | |
| 5,752,882 | A | 5/1998 | Acres et al. | 463/42 |
| 5,759,102 | A | 6/1998 | Pease et al. | 463/42 |
| 5,761,647 | A | 6/1998 | Boushy | |
| 5,762,552 | A * | 6/1998 | Vuong et al. | 463/42 |
| 5,766,076 | A * | 6/1998 | Pease et al. | 463/27 |
| 5,768,382 | A | 6/1998 | Schneier et al. | 380/23 |
| 5,770,533 | A | 6/1998 | Franchi | |
| 5,779,545 | A | 7/1998 | Berg et al. | |
| 5,779,549 | A | 7/1998 | Walker et al. | |
| 5,797,795 | A | 8/1998 | Takemoto et al. | |
| 5,800,269 | A | 9/1998 | Holch et al. | 463/42 |
| 5,819,107 | A | 10/1998 | Lichtman et al. | |
| 5,820,459 | A | 10/1998 | Acres et al. | 463/25 |
| 5,828,843 | A * | 10/1998 | Grimm et al. | 709/228 |
| 5,833,540 | A | 11/1998 | Miodunski et al. | |
| 5,836,817 | A * | 11/1998 | Acres et al. | 463/26 |
| 5,845,077 | A | 12/1998 | Fawcett | |
| 5,845,090 | A | 12/1998 | Collins, III et al. | |
| 5,845,902 | A * | 12/1998 | Takemoto | 273/121 B |
| 5,848,064 | A | 12/1998 | Cowan | |
| 5,851,149 | A * | 12/1998 | Xidos et al. | 463/42 |
| 5,855,515 | A * | 1/1999 | Pease et al. | 463/27 |
| 5,870,723 | A | 2/1999 | Pare, Jr. et al. | |
| 5,871,400 | A | 2/1999 | Yfantis | |
| 5,876,284 | A | 3/1999 | Acres et al. | 463/25 |
| 5,885,158 | A | 3/1999 | Torango et al. | |
| 5,896,566 | A | 4/1999 | Averbuch et al. | |
| 5,902,983 | A * | 5/1999 | Crevelt et al. | 235/380 |
| 5,905,523 | A | 5/1999 | Woodfield et al. | |
| 5,925,127 | A | 7/1999 | Ahmad | |
| 5,935,000 | A | 8/1999 | Sanchez, III et al. | |
| 5,941,771 | A | 8/1999 | Haste, III | |
| 5,943,241 | A | 8/1999 | Nichols et al. | |
| 5,949,042 | A | 9/1999 | Dietz, II et al. | |
| 5,970,143 | A | 10/1999 | Schneier | |
| 5,971,855 | A * | 10/1999 | Ng | 463/42 |
| 5,980,384 | A | 11/1999 | Barrie | |
| 5,980,385 | A | 11/1999 | Clapper, Jr. | |
| 5,987,376 | A * | 11/1999 | Olson et al. | 701/201 |
| 5,999,808 | A | 12/1999 | LaDue | |
| 6,001,016 | A | 12/1999 | Walker et al. | |
| 6,002,772 | A | 12/1999 | Saito | |
| 6,003,013 | A | 12/1999 | Boushy et al. | |
| 6,006,034 | A | 12/1999 | Heath et al. | |
| 6,009,458 | A * | 12/1999 | Hawkins et al. | 709/203 |
| 6,029,046 | A | 2/2000 | Khan et al. | |
| 6,038,666 | A | 3/2000 | Hsu et al. | |
| 6,047,128 | A | 4/2000 | Zander | |
| 6,047,324 | A | 4/2000 | Ford | |
| 6,048,269 | A | 4/2000 | Burns et al. | |
| 6,052,512 | A | 4/2000 | Peterson et al. | |
| 6,071,190 | A | 6/2000 | Weiss et al. | |
| 6,098,837 | A | 8/2000 | Izawa et al. | |
| 6,099,408 | A | 8/2000 | Schneier et al. | 463/29 |
| 6,104,815 | A | 8/2000 | Alcorn et al. | 380/251 |
| 6,106,396 | A | 8/2000 | Alcorn et al. | 463/29 |
| 6,113,098 | A | 9/2000 | Adams | |
| 6,113,492 | A | 9/2000 | Walker et al. | |
| 6,113,495 | A | 9/2000 | Walker et al. | |
| 6,125,185 | A | 9/2000 | Boesch | |
| 6,135,884 | A | 10/2000 | Hedrick et al. | |
| 6,135,887 | A | 10/2000 | Pease et al. | |
| 6,146,277 | A | 11/2000 | Ikeda | |
| 6,149,522 | A | 11/2000 | Alcorn et al. | 463/29 |
| 6,154,878 | A | 11/2000 | Saboff | |
| 6,159,098 | A | 12/2000 | Stomiany et al. | |
| 6,165,072 | A | 12/2000 | Davis et al. | |
| 6,169,976 | B1 | 1/2001 | Colosso | |
| 6,178,510 | B1 | 1/2001 | O'Connor et al. | |
| 6,183,362 | B1 | 2/2001 | Boushy | |
| 6,190,256 | B1 | 2/2001 | Walker et al. | |
| 6,193,152 | B1 | 2/2001 | Fernando et al. | |
| 6,193,608 | B1 | 2/2001 | Walker et a. | |
| 6,199,107 | B1 | 3/2001 | Duari | |
| 6,219,836 | B1 | 4/2001 | Wells et al. | |
| 6,253,374 | B1 | 6/2001 | Dresevic et al. | |
| 6,254,483 | B1 * | 7/2001 | Acres | 463/26 |
| 6,264,561 | B1 | 7/2001 | Saffari et al. | |
| 6,280,328 | B1 | 8/2001 | Holch et al. | |
| 6,285,868 | B1 | 9/2001 | LaDuc | |
| 6,285,886 | B1 | 9/2001 | Kamel et al. | |
| 6,293,865 | B1 * | 9/2001 | Kelly et al. | 463/16 |
| 6,302,793 | B1 | 10/2001 | Fertitta, III et al. | |
| 6,306,035 | B1 * | 10/2001 | Kelly et al. | 463/25 |
| 6,310,873 | B1 | 10/2001 | Rainis et al. | |
| 6,315,663 | B1 | 11/2001 | Sakamoto | |
| 6,317,827 | B1 | 11/2001 | Cooper | |
| 6,328,648 | B1 * | 12/2001 | Walker et al. | 463/20 |
| 6,340,331 | B1 | 1/2002 | Saunders et al. | |
| 6,343,990 | B1 | 2/2002 | Rasmussen et al. | |
| 6,347,996 | B1 | 2/2002 | Gilmore et al. | |
| 6,351,688 | B1 | 2/2002 | Nichols et al. | |
| 6,364,769 | B1 | 4/2002 | Weiss et al. | |
| 6,368,216 | B1 | 4/2002 | Hedrick et al. | |
| 6,368,219 | B1 | 4/2002 | Szrek et al. | |
| 6,371,852 | B1 | 4/2002 | Acres | |
| 6,402,618 | B1 * | 6/2002 | Reed et al. | 463/40 |
| 6,409,602 | B1 * | 6/2002 | Wiltshire et al. | 463/42 |
| 6,446,257 | B1 | 9/2002 | Pradhan et al. | |
| 6,449,687 | B1 | 9/2002 | Moriya | |
| 6,453,319 | B1 | 9/2002 | Mattis et al. | |
| 6,454,648 | B1 | 9/2002 | Kelly et al. | |
| 6,488,585 | B1 | 12/2002 | Wells et al. | |
| 6,508,709 | B1 | 1/2003 | Karmarkar | |
| 6,508,710 | B1 * | 1/2003 | Paravia et al. | 463/42 |
| 6,554,705 | B1 | 4/2003 | Cumbers | |
| 6,575,829 | B2 | 6/2003 | Coleman et al. | |
| 6,607,439 | B2 | 8/2003 | Schneier et al. | |
| 6,638,170 | B1 | 10/2003 | Crumby | |
| 6,645,077 | B2 | 11/2003 | Rowe | |
| 6,645,078 | B1 | 11/2003 | Mattice | |
| 6,652,378 | B2 | 11/2003 | Cannon et al. | |
| 6,656,040 | B1 | 12/2003 | Brosnan et al. | |
| 6,666,765 | B2 | 12/2003 | Vancura | |
| 6,682,423 | B2 * | 1/2004 | Brosnan et al. | 463/29 |
| 6,684,195 | B1 | 1/2004 | Deaton et al. | |
| 6,739,973 | B1 | 5/2004 | Lucchesi et al. | |
| 6,745,236 | B1 * | 6/2004 | Hawkins et al. | 709/218 |
| 6,749,502 | B2 | 6/2004 | Baerlocher | |
| 6,749,510 | B2 | 6/2004 | Giobbi | |
| 6,805,634 | B1 | 10/2004 | Wells et al. | |
| 6,853,973 | B2 | 2/2005 | Mathews et al. | |
| 6,866,586 | B2 | 3/2005 | Oberberger et al. | |
| 6,875,110 | B1 | 4/2005 | Crumby | |
| 6,896,618 | B2 | 5/2005 | Benoy et al. | |
| 6,908,387 | B2 | 6/2005 | Hedrick et al. | |
| 6,910,079 | B2 | 6/2005 | Zimmermann et al. | |
| 6,913,531 | B1 * | 7/2005 | Yoseloff | 463/13 |
| 6,935,946 | B2 * | 8/2005 | Yoseloff et al. | 463/16 |
| 6,962,530 | B2 | 11/2005 | Jackson | |
| 6,988,267 | B2 * | 1/2006 | Harris et al. | 717/173 |
| 6,997,803 | B2 | 2/2006 | LeMay et al. | |

| | | | | |
|---|---|---|---|---|
| 7,127,069 | B2 * | 10/2006 | Nguyen | 380/278 |
| 7,168,089 | B2 | 1/2007 | Nguyen et al. | |
| 7,318,775 | B2 * | 1/2008 | Brosnan et al. | 463/25 |
| 7,399,229 | B2 * | 7/2008 | Rowe | 463/42 |
| 7,438,643 | B2 * | 10/2008 | Brosnan et al. | 463/42 |
| 7,455,591 | B2 * | 11/2008 | Nguyen | 463/42 |
| 7,470,182 | B2 * | 12/2008 | Martinek et al. | 463/16 |
| 7,480,857 | B2 | 1/2009 | Benbrahim et al. | |
| 7,515,718 | B2 * | 4/2009 | Nguyen et al. | 380/278 |
| 7,618,317 | B2 * | 11/2009 | Jackson | 463/24 |
| 7,636,859 | B2 * | 12/2009 | Little et al. | 713/191 |
| 7,780,526 | B2 * | 8/2010 | Nguyen et al. | 463/29 |
| 7,785,204 | B2 * | 8/2010 | Wells et al. | 463/42 |
| 7,828,654 | B2 * | 11/2010 | Carter, Sr. | 463/29 |
| 2001/0021666 | A1 | 9/2001 | Yoshida et al. | |
| 2001/0031663 | A1 | 10/2001 | Johnson | |
| 2001/0036854 | A1 | 11/2001 | Okuniewicz | |
| 2001/0036855 | A1 | 11/2001 | DeFrees-Parrott et al. | |
| 2001/0039210 | A1 | 11/2001 | St-Denis | |
| 2001/0044337 | A1 | 11/2001 | Rowe et al. | |
| 2001/0044339 | A1 | 11/2001 | Cordero et al. | |
| 2001/0053712 | A1 * | 12/2001 | Yoseloff et al. | 463/1 |
| 2002/0002075 | A1 | 1/2002 | Rowe | |
| 2002/0016202 | A1 | 2/2002 | Fertitta et al. | |
| 2002/0022516 | A1 | 2/2002 | Forden | |
| 2002/0034980 | A1 | 3/2002 | Lemmons et al. | |
| 2002/0045477 | A1 | 4/2002 | Dabrowski | |
| 2002/0049909 | A1 | 4/2002 | Jackson et al. | |
| 2002/0050683 | A1 * | 5/2002 | Hirota | 273/121 B |
| 2002/0071557 | A1 | 6/2002 | Nguyen | |
| 2002/0093136 | A1 | 7/2002 | Moody | |
| 2002/0107065 | A1 | 8/2002 | Rowe | |
| 2002/0111205 | A1 | 8/2002 | Beavers | |
| 2002/0116615 | A1 * | 8/2002 | Nguyen et al. | 713/168 |
| 2002/0132662 | A1 | 9/2002 | Sharp et al. | |
| 2002/0137217 | A1 | 9/2002 | Rowe | |
| 2002/0142844 | A1 | 10/2002 | Kerr | |
| 2002/0151359 | A1 * | 10/2002 | Rowe | 463/29 |
| 2002/0155887 | A1 * | 10/2002 | Criss-Puszkiewicz et al. | 463/29 |
| 2003/0009542 | A1 | 1/2003 | Kasal et al. | |
| 2003/0032485 | A1 | 2/2003 | Cockerille | |
| 2003/0036425 | A1 * | 2/2003 | Kaminkow et al. | 463/25 |
| 2003/0045356 | A1 | 3/2003 | Thomas | |
| 2003/0064771 | A1 | 4/2003 | Morrow et al. | |
| 2003/0069074 | A1 | 4/2003 | Jackson | |
| 2003/0095791 | A1 | 5/2003 | Barton et al. | |
| 2003/0100371 | A1 | 5/2003 | Gatto et al. | |
| 2003/0157979 | A1 | 8/2003 | Cannon et al. | |
| 2003/0186734 | A1 | 10/2003 | LeMay et al. | |
| 2003/0187853 | A1 | 10/2003 | Hensley et al. | |
| 2003/0188306 | A1 | 10/2003 | Harris et al. | |
| 2004/0002385 | A1 * | 1/2004 | Nguyen | 463/42 |
| 2004/0048671 | A1 * | 3/2004 | Rowe | 463/42 |
| 2004/0067794 | A1 | 4/2004 | Coetzee | |
| 2004/0092310 | A1 * | 5/2004 | Brosnan et al. | 463/42 |
| 2004/0137978 | A1 | 7/2004 | Cole et al. | |
| 2004/0147314 | A1 | 7/2004 | LeMay et al. | |
| 2004/0152517 | A1 | 8/2004 | Hardisty et al. | |
| 2004/0166931 | A1 | 8/2004 | Criss-Puszkiewicz et al. | |
| 2004/0180722 | A1 | 9/2004 | Giobbi | |
| 2004/0242322 | A1 | 12/2004 | Montagna et al. | |
| 2004/0248651 | A1 | 12/2004 | Gagner | |
| 2004/0259640 | A1 | 12/2004 | Gentles et al. | |
| 2005/0059470 | A1 | 3/2005 | Cannon | |
| 2005/0108519 | A1 | 5/2005 | Barton et al. | |
| 2005/0108769 | A1 | 5/2005 | Arnold et al. | |
| 2005/0113172 | A1 | 5/2005 | Gong | |
| 2005/0120040 | A1 | 6/2005 | Williams et al. | |
| 2005/0137016 | A1 | 6/2005 | Enzminger et al. | |
| 2005/0153778 | A1 | 7/2005 | Nelson et al. | |
| 2005/0192099 | A1 * | 9/2005 | Nguyen et al. | 463/42 |
| 2005/0216942 | A1 | 9/2005 | Barton | |
| 2005/0221898 | A1 | 10/2005 | Gatto et al. | |
| 2005/0288080 | A1 | 12/2005 | Lockton et al. | |
| 2006/0009273 | A2 | 1/2006 | Moshal | |
| 2006/0019749 | A1 | 1/2006 | Merati et al. | |
| 2006/0035713 | A1 | 2/2006 | Cockerille et al. | |
| 2006/0046855 | A1 | 3/2006 | Nguyen et al. | |
| 2006/0068871 | A1 | 4/2006 | Crawford et al. | |
| 2006/0073869 | A1 | 4/2006 | LeMay et al. | |
| 2006/0160621 | A1 * | 7/2006 | Rowe et al. | 463/42 |
| 2006/0247028 | A1 * | 11/2006 | Brosnan et al. | 463/25 |
| 2006/0258428 | A1 | 11/2006 | Blackburn et al. | |
| 2006/0264256 | A1 | 11/2006 | Gagner et al. | |
| 2006/0281541 | A1 | 12/2006 | Nguyen et al. | |
| 2007/0004506 | A1 | 1/2007 | Kinsley et al. | |
| 2007/0026935 | A1 | 2/2007 | Wolf et al. | |
| 2007/0032301 | A1 | 2/2007 | Acres et al. | |
| 2007/0060361 | A1 | 3/2007 | Nguyen et al. | |
| 2007/0060363 | A1 | 3/2007 | Nguyen et al. | |
| 2007/0178970 | A1 | 8/2007 | LeMay et al. | |
| 2007/0207852 | A1 | 9/2007 | Nelson et al. | |
| 2007/0270213 | A1 | 11/2007 | Nguyen et al. | |
| 2008/0090654 | A1 | 4/2008 | Okada | |
| 2008/0192058 | A1 | 8/2008 | Liu et al. | |
| 2009/0209332 | A1 | 8/2009 | Soukup et al. | |
| 2010/0099491 | A1 | 4/2010 | Little et al. | |

FOREIGN PATENT DOCUMENTS

| | | | |
|---|---|---|---|
| DE | 197 30 002 | A1 | 12/1997 |
| EP | 0 689 325 | | 6/1995 |
| EP | 0 706 275 | | 4/1996 |
| EP | 0715245 | | 6/1996 |
| EP | 0744786 | | 11/1996 |
| EP | 0769769 | | 4/1997 |
| EP | 0841 615 | | 5/1998 |
| EP | 0 905 614 | | 3/1999 |
| EP | 1 004 970 | | 5/2000 |
| EP | 1061430 | | 12/2000 |
| EP | 1074955 | | 2/2001 |
| EP | 1 199 690 | A2 | 4/2002 |
| EP | 1231577 | | 8/2002 |
| EP | 1255234 | | 11/2002 |
| EP | 1414534 | | 1/2003 |
| EP | 1291048 | | 3/2003 |
| EP | 1391226 | | 2/2004 |
| EP | 1 396 829 | | 3/2004 |
| EP | 1473682 | | 11/2004 |
| EP | 1 895 483 | | 3/2008 |
| GB | 2 151 054 | A | 7/1985 |
| GB | 2151054 | | 7/1985 |
| GB | 2251112 | | 6/1992 |
| GB | 2392276 | | 10/2004 |
| RU | 2124230 | | 12/1998 |
| WO | WO95-024689 | | 9/1995 |
| WO | WO96-000950 | | 1/1996 |
| WO | WO97-030549 | | 8/1997 |
| WO | WO99-00164 | | 1/1999 |
| WO | WO99-001188 | | 1/1999 |
| WO | WO00-067424 | | 11/2000 |
| WO | WO01-020424 | | 3/2001 |
| WO | WO 01/20424 | A2 | 3/2001 |
| WO | WO01-099067 | | 12/2001 |
| WO | WO02-001350 | | 1/2002 |
| WO | WO02-005229 | | 1/2002 |
| WO | WO02-017251 | | 2/2002 |
| WO | WO 2002-21468 | | 3/2002 |
| WO | WO02-073501 | | 9/2002 |
| WO | WO 2002-077935 | | 10/2002 |
| WO | WO03-006129 | | 1/2003 |
| WO | WO 03/019486 | | 6/2003 |
| WO | WO03-019486 | | 6/2003 |
| WO | WO 2004-021290 | | 3/2004 |
| WO | WO07-005290 | | 1/2007 |
| WO | WO07-032879 | | 3/2007 |
| WO | WO 2007-032888 | | 3/2007 |
| WO | WO 2007-044175 | | 4/2007 |
| WO | WO07-120450 | | 10/2007 |
| WO | WO08-016610 | | 2/2008 |
| WO | WO 2010-045004 | | 4/2010 |

OTHER PUBLICATIONS

Oracle Corporation, www.oracle.com/collateral/ent_partioning_fc.pdf, Feb. 1999.

Hiroaki Higaki, 8 page document entitled "Group Communication Algorithm for Dynamically Updating in Distributed Systems" Copyright 1994 IEEE International Conference On Parallel and Distributed Systems (pp. 56-62) 08-8186-655-6/94, higaki@sdesun.slab.ntt.jp.
Steffen Hauptmann, et al., 12 page document entitled "On-line Maintenance With On-The-Fly Software Replacement" Copyright 1996 IEEE Proceedings, Third International Conference On Configurable Distributed Systems, (pp. 70-80) 0-8186-7395-8/96.
Hiroaki Higaki, 9 page document entitled "Extended Group Communication Algorithm for Updating Distributed Programs" Copyright 1996, IEEE, International Conference On Parallel and Distributed Systems, 0-8186-7267-6/96, hig@takilab.k.dendai.as.jp.
U.S. Appl. No. 09/642,192, entitled "Virtual Player Tracking and Related Services," filed Aug. 18, 2000, by LeMay, et al.
U.S. Appl. No. 12/253,525, entitled "Post Certification Metering For Diverse Game Machines," filed Oct. 17, 2008, by Little et al.
U.S. Office Action mailed Jul. 1, 2002 issued in U.S. Appl. No. 09/642,192.
U.S. Interview Summary mailed Oct. 9, 2002 issued in U.S. Appl. No. 09/642,192.
U.S. Final Office Action mailed Jan. 2, 2003 issued in U.S. Appl. No. 09/642,192.
U.S. Interview Summary mailed Jan. 14, 2003 issued in U.S. Appl. No. 09/642,192.
U.S. Advisory Action mailed Jan. 29, 2003 issued in U.S. Appl. No. 09/642,192.
U.S. Office Action mailed Apr. 21, 2003 issued in U.S. Appl. No. 09/642,192.
U.S. Final Office Action mailed Sep. 30, 2003 issued in U.S. Appl. No. 09/642,192.
U.S. Interview Summary mailed Oct. 22, 2003 issued in U.S. Appl. No. 09/642,192.
U.S. Advisory Action mailed Nov. 6, 2003 issued in U.S. Appl. No. 09/642,192.
U.S. Office Action mailed Feb. 10, 2004 issued in U.S. Appl. No. 09/642,192.
U.S. Office Action mailed Jul. 1, 2004 issued in U.S. Appl. No. 09/642,192.
U.S. Interview Summary mailed Mar. 14, 2004 issued in U.S. Appl. No. 09/642,192.
U.S. Notice of Informal or Non-Responsive RCE Amendment mailed Jan. 11, 2006 issued in U.S. Appl. No. 09/642,192.
U.S. Final Office Action mailed Mar. 28, 2006 issued in U.S. Appl. No. 09/642,192.
U.S. Office Action mailed Nov. 20, 2006 issued in U.S. Appl. No. 09/642,192.
U.S. Office Action mailed Jan. 20, 2010 issued in U.S. Appl. No. 11/731,406.
U.S. Final Office Action mailed Jul. 2, 2010 issued in U.S. Appl. No. 11/731,406.
U.S. Office Action mailed May 18, 2004 issued in U.S. Appl. No. 10/097,507.
U.S. Final Office Action mailed May 17, 2005 issued in U.S. Appl. No. 10/097,507.
U.S. Notice of Allowance mailed Aug. 31, 2005 issued in U.S. Appl. No. 10/097,507.
U.S. Office Action mailed Dec. 24, 2009 issued in U.S. Appl. No. 11/285,898.
U.S. Final Office Action mailed May 26, 2010 issued in U.S. Appl. No. 11/285,898.
U.S. Office Action mailed Mar. 8, 2010 issued in U.S. Appl. No. 11/497,740.
U.S. Office Action mailed Jan. 7, 2010 issued in U.S. Appl. No. 11/881,190.
U.S. Final Office Action mailed Jun. 11, 2010 issued in U.S. Appl. No. 11/881,190.
U.S. Office Action mailed Apr. 4, 2006 issued in U.S. Appl. No. 10/230,604.
U.S. Final Office Action mailed Oct. 12, 2006 issued in U.S. Appl. No. 10/230,604.
U.S. Advisory Action mailed Jan. 31, 2007 issued in U.S. Appl. No. 10/230,604.
U.S. Notice of Panel Decision from Pre-Appeal Brief Review mailed Jun. 19, 2007 issued in U.S. Appl. No. 10/230,604.
U.S. Office Action mailed Mar. 18, 2008 issued in U.S. Appl. No. 10/230,604.
U.S. Final Office Action mailed Aug. 18, 2008 issued in U.S. Appl. No. 10/230,604.
U.S. Office Action mailed May 13, 2008 issued in U.S. Appl. No. 11/173,442.
U.S. Final Office Action mailed Nov. 4, 2008 issued in U.S. Appl. No. 11/173,442.
U.S. Office Action mailed Apr. 30, 2009 issued in U.S. Appl. No. 11/173,442.
U.S. Final Office Action mailed Dec. 21, 2009 issued in U.S. Appl. No. 11/173,442.
U.S. Office Action mailed Jul. 7, 2010 issued in U.S. Appl. No. 11/173,442.
U.S. Office Action mailed Oct. 6, 2008 issued in U.S. Appl. No. 11/224,814.
U.S. Office Action mailed Aug. 3, 2009 issued in U.S. Appl. No. 11/224,814.
U.S. Final Office Action mailed Feb. 25, 2010 issued in U.S. Appl. No. 11/224,814.
U.S. Advisory Action mailed May 18, 2010 issued in U.S. Appl. No. 11/224,814.
U.S. Office Action mailed Jul. 27, 2009 issued in U.S. Appl. No. 11/225,337.
U.S. Final Office Action mailed Feb. 1, 2010 issued in U.S. Appl. No. 11/225,337.
U.S. Advisory Action mailed Apr. 12, 2010 issued in U.S. Appl. No. 11/225,337.
U.S. Office Action mailed Jul. 19, 2010 issued in U.S. Appl. No. 11/225,337.
Australian Examiner's First Report dated Dec. 1, 2005 issued in AU2001283264.
Australian First Examination Report dated May 22, 2008, issued in AU2003200934.
Australian Second Examination Report dated Aug. 8, 2006 issued in AU2003251941.
Australian Examination Report dated Jun. 28, 2006 issued in AU2003251941.
Australian Examination Report dated Aug. 2, 2007 issued in AU2003251941.
Canadian Office Action dated Jul. 28, 2009 issued in CA2,420,224.
Chinese Office Action mailed Jul. 31, 2009, issued in CN200780036010.9.
Chinese First Office Action dated Sep. 25, 2009 issued in CN200680033246.2.
Chinese Office Action dated Oct. 9, 2009 issued in CN2006800335028.
European Office Action dated Feb. 10, 2009 issued in EP01962051.7.
European Communication of Proceedings Before The Board of Appeal dated Jun. 4, 2010 issued in EP06773680.1.
European Consultation with Examiner dated Dec. 18, 2008 issued in EP06773680.1.
European Decision to Refuse European Patent Application dated Jan. 8, 2010 issued in EP06773680.1.
European Communication dated Apr. 14, 2008 issued in EP06773680.1.
European Minutes of Oral Proceedings dated Jan. 8, 2010 issued in EP06773680.1.
European Office Action re Result of Consultation on Preliminary Examination of Application Prior to Oral Proceedings dated Sep. 24, 2009 issued in EP06773680.1.
European Summons to Attend Oral Proceedings Pursuant to Rule 115(1)EPC dated Nov. 27, 2008 issued in EP06773680.1.
European Office Action dated Dec. 28, 2009 issued in EP03791582.4.
European Examination Report dated Jun. 2, 2008 issued in EP 06 813 743.9.
European Summons to Attend Oral Proceedings Pursuant to Rule 115(1)EPC dated Nov. 21, 2008 issued in EP06813743.9.
PCT International Written Opinion dated Mar. 31, 2003 issued in W02002/01725 (PCT/US01/25091-P031W0).

PCT International Preliminary Report on Patentability dated Feb. 3, 2009 issued in W02008/016610 (PCT/US2007/017121-P046C1X1W0).
PCT International Preliminary Report on Patentability and Written Opinion dated Jan. 9, 2008 issued in PCT/US2006/024129.
PCT International Search Report dated Oct. 11, 2006 issued in W02007/005290 (PCT/US2006/024129-P153WO).
PCT International Search Report dated Feb. 15, 2007 issued in WO/2007/032879 (PCT/U52006/033185-P165WO).
PCT Written Opinion dated Feb. 15, 2007 issued in WO/2007/032879 (PCT/U52006/033185-165W0).
Russian Office Action (with English translation) dated Apr. 10, 2007 issued in RU2005108664.
"1,001 Windows 95 Tips, Operating System Shortcuts" (1995) Synapse Adaptive.com, Access and Productivity Tools, webpage retrieved from the Internet at http://www.synapseadaptive.com/tools/Win95%20keyboard%20shortcuts.html, on Dec. 8, 2009, 3 pages.
"Noble Poker: Security & Integrity" (2005) advertisement from NoblePoker.com retrieved from the Internet at http://web.archive.org/web/20050512081751/http://www.noblepoker.com on May 12, 2005, XP-002465543, 2 pages.
CS Guard, Dec. 19, 2001, Half-Life www.olo.counter.com, webpage retrieved http://www.olo.counter-strike.pl/index.php?page=archive on Jun 3, 2010, p. 3 of 5 pages.
Gaming Standards Association (2007), "G2S Basics," webpage retrieved from Internet at http://www.gamingstandards.com/pdfs/G2S_Sheet_final.pdf, on Sep. 5, 2008, 2 pages.
Gaming Standards Association (2007) (author unknown), "S2S Message Protocol v1.2 with Errata Sheet 1," Chapter 13, pp. 289-308. [online] retrieved from Internet on Sep. 23, 2008. http://www.gamingstandards.com/index.php?page=standards/free_downloads_standards.
HBP-10 Bill Dispenser, Multi-Country Platform (2001) JCM American, retrieved from the Internet at http://www.jcm-american.com/bill_dispensers.html on Sep. 20, 2001, 1 page.
HBP-5 Note Hopper (2001) JCM American, retrieved from the Internet at http://www.jcm-american.com/sub-note-hoppers.html on Sep. 20, 2001, 1 page.
Adamec, J. (2006) "Checkraise: The Bots", Blogcritics.org News, downloaded from http://blogtronics.org/archive/2005/09/09/093200.php on Jun. 30, 2006, 3 pages.
PcToolsTM Guides, "Manage the CPU Task Priority," www.pctools.com, webpage retrieved from the internet at http://www.pctools.com/guides/registry/detail.1179, Sep. 16, 2002, 2 pgs.
Golle, Philippe et al., "Preventing Bots from Playing Online Games" ACM Computers in Entertainment, [Online] vol. 3, No. 3, Jul. 2005, pp. 1-10, XP002465544 Retrieved from the Internet: http://portal.acm.org/citation.cfm?doid=1077246.1077255.
Wang et al, "Casino techology player tracking and slot accounting systems," Database Inspec [Online] *The Institution of Electrical Engineers*, Stevenage, GB; Database accession No. 7228747; XP002231402; abstract.
Webster's 1913 Dictionary, Definition of "Continuous" as shown in Webster's Online Dictionary, retrieved from the Internet at http://www.webster-dictionary.org/definition/ continuous on Mar. 2, 2009, 2 pgs.
Webster's 1913 Dictionary, Definition of "Regular" as shown in Webster's Online Dictionary, retrieved from the Internet at http://www.webster-dictionary.org/definition/ regular on Mar. 2, 2009, 3 pgs.
Windows 3.1 Resource Kit, Jul. 30, 2001, Microsoft.com, retrieved from the Internet at http://support.microsoft.com/kb/83433 on Feb. 8, 2009 and on Aug. 27, 2010.
PCT International Search Report dated Nov. 13, 2003 issued in PCT/US2003/22180.
Australian Examiner's First Report dated Aug. 7, 2009 issued in AU2008201281.
Chinese First Office Action dated Nov. 25, 2010 issued in CN200780036010.9.
PCT International Preliminary Report on Patentability and Written Opinion mailed Mar. 18, 2008 issued in PCT/US2006/033429.
Australian Examiner's First Report dated Nov. 18, 2010 issued in AU 2006291294.
PCT International Search Report dated May 7, 2010 issued in PCT/US2009/058664.
U.S. Office Action Final mailed Aug. 12, 2010 issued in U.S. Appl. No. 11/497,740.
U.S. Examiner Interview Summary mailed Dec. 16, 2010 issued in U.S. Appl. No. 11/497,740.
U.S. Office Action mailed Nov. 24, 2010 issued in U.S. Appl. No. 11/881,190.
U.S. Examiner Interview Summary mailed Sep. 21, 2010 issued in U.S. Appl. No. 11/173,442.
U.S. Office Action mailed Dec. 8, 2010 issued in U.S. Appl. No. 11/173,442.
U.S. Notice of Allowance mailed Oct. 7, 2010 issued in U.S. Appl. No. 11/224,814.
U.S. Response to 312 Amendment mailed Nov. 26, 2010 issued in U.S. Appl. No. 11/224,814.
U.S. Examiner Interview Summary mailed Oct. 14, 2010 issued in U.S. Appl. No. 11/225,337.
PCT International Preliminary Examination Report mailed Oct. 25, 2002 issued in PCT/US01/17896.
PCT International Search Report mailed Mar. 14, 2002 issued in PCT/US01/17896.
PCT International Preliminary Examination Report mailed Jun. 27, 2003 issued in PCT/US01/25091.
PCT International Search Report mailed Mar. 5, 2003 issued in PCT/US01/25091.
Canadian Office Action dated Aug. 5, 2010 issued in CA 2,420,224.
PCT International Search Report mailed Apr. 7, 2008 issued in PCT/US2007/017121.
PCT Written Opinion mailed Apr. 7, 2008, issued in PCT/US2007/017121.
PCT Partial International Search Report mailed Jan. 25, 2008 issued in PCT/US2007/017121.
AU Examiner's First Report dated Oct. 22, 2010 issued in 2006266236.
PCT International Preliminary Report on Patentability and Written Opinion dated Mar. 18, 2008 issued in PCT/US2006/033185.
Chinese Second Office Action dated Sep. 10, 2010 issued in CN200680033246.2.
European Result of Consultation and Brief Communication mailed Apr. 28, 2009 issued in EP06813743.9.
PCT International Search Report mailed Dec. 4, 2006 issued in PCT/US2006/033429.
PCT Written Opinion mailed Dec. 4, 2006 issued in PCT/US2006/033429.

* cited by examiner

USING A GAMING MACHINE AS A SERVER

BACKGROUND OF THE INVENTION

This invention relates to game playing methods for gaming machines such as slot machines and video poker machines. More particularly, the present invention relates to hardware and methods for allowing gaming machines to provide gaming information services in a network of gaming machines.

A typical gaming machine includes a wide variety of constituent devices. Some examples include lights, slot reels, ticket printers, card readers, speakers, bill validators, coin acceptors, display panels, key pads, bonus wheels, and button pads. Groups of these devices provide the features which together present a game. Typically these devices are built into the gaming machine.

Modern gaming machines typically utilize a master gaming controller to control various combinations of devices to allow a player to play a game on the gaming machine. For example, game play on a gaming machine usually requires a player to input money or indicia of credit into the gaming machine, indicate a wager amount, and initiate game play. These steps require the gaming machine to operate input devices including bill validators and coin acceptors to accept money into the gaming machine and recognize user inputs from devices including key pads and button pads to determine the wager amount and initiate game play.

Multiple gaming machines can be linked together via a communication network to provide various gaming services such as progressive game services. When a gaming machine is connected to a network, information about the status of the gaming machine may be sent to a remote location and information, including operating instructions for the gaming machine, may be received from the remote location. Typically, a separate game server, such as workstation or mainframe, provides one or more gaming services to the gaming machines connected to the network.

For progressive game play, the amount of money entered into a group of gaming machines may be pooled together to provide a larger jackpot as part of a wide area progressive network. As money is deposited in an individual gaming machine, this information can be relayed over a communication network to a progressive game server at some central location where the total amount of money in the jackpot is tracked. The information on the progressive jackpot may be sent out over the wide area progressive network to display signs displaying the jackpot amount and to gaming machines in the network. When a player playing a game on a gaming machine in the progressive network wins the progressive jackpot, a signal is sent from the gaming machine to the progressive game server and the jackpot is reset to some initial amount. In addition to progressive games, gaming machine networks may provide various other bonus games that involve a number of gaming machines participating for a common goal.

Accounting is another example of a gaming service which may be provided to a group of gaming machines by a game server. A group of gaming machines provided in a casino may be linked together to form a casino area network. Many current gaming machines contain player tracking devices, including card readers, display panels, and key pad interfaces, that allow a player playing a game on a gaming machine to enter information into the gaming machine. Using the casino area network, the player tracking information entered into the gaming machine by the player may be sent to a player account server, which is usually a separate PC, workstation, or mainframe, at a remote location different from the gaming machine. Further, other information about the status of the gaming machine including the amount of usage and whether the gaming machine is operating properly may also be sent via the casino area network to a remote accounting game server.

To provide a network service to a group of gaming machines, the gaming machines are connected in some manner. A group of gaming machines may be connected together in a daisy chain or a loop with information propagated up and down the chain or around the loop via connections between communication boards located within each gaming machine. Multiple loops or chains of gaming machines connected together may form a gaming machine network. Each entity in the network that receives and transmits messages is a "node." Usually, within the chain or loop in the network, one entity coordinates the communication of information within the network. This "master" node, which is usually a separate remote server, transmits and receives messages that coordinate the required information flow needed to provide a particular network service including accounting services for bonus games or progressive games. The master node, which is typically a workstation or mainframe, communicates with all of the nodes that comprise the network. Most or all of the remaining nodes in the network are usually hardware devices (e.g. concentrators) mounted within the gaming machines or the gaming machines. For example, many gaming machines include player tracking hardware which may transmit accounting and player tracking information to a master node. The gaming machine communicates with the player tracking device like another node even when it is mounted within the gaming machine. The player tracking hardware is usually physically mounted within the gaming machine but may be located outside of the gaining machine as well. Typically, gaming machine nodes and hardware nodes transmit information needed by the master node, receive information needed to provide a particular network service such as bonus or progressive game play, echo messages to the master node from other gaming machines and echo messages to from the master node to other gaming machines.

The hardware and communication infrastructure needed to provide the various network services including accounting, bonus game play and progressive game play are usually totally separate for each gaming service. For example, for a group of gaming machines bonus game play service may be provided by a first server, accounting may be provided by a another server, and progressive game play may be provided by yet another server (3 servers total). Further, each network service may be provided over a separate communication network. Complicating matters even further, the servers, gaming machines and other hardware in each network may employ different communication protocols requiring communication translators to convert from one communication protocol to another communication protocol. Typically, the translators are implemented as additional nodes in each network. Also, in some applications, the data from a number of gaming machines may be collected and integrated for transmittal to a server using concentrators.

From the above, it should be apparent that modern sophisticated network based gaming requires expensive hardware and communication infrastructure that must be separately installed and maintained for each game service. As a result, many of the gaming services described above are only implemented in large establishments such as casinos because only large establishments can afford the initial infrastructure costs and the continual maintenance costs associated with the gaming services. Accordingly, it would be desirable to provide gaming hardware that reduces the installation and maintenance costs associated with implementing gaming services including bonus game play, progressive game play and accounting.

Another disadvantage of the current approach to providing network services on a gaming network is that additional hardware and software associated with the various services greatly slows the data transmission rate. For example, on a gaming network with many gaming machines, multiple data concentrators, multiple communication translators and multiple servers, communication delays of up to 2-3 seconds commonly occur between certain gaming machines and a server providing a game service. For some applications, such large communication delays are unacceptable. For example, for bonus game play, large communication delays may allow players to time their game play to coincide with bonus events on the gaming machine. Accordingly, it would be desirable to provide simpler and more efficient gaming hardware that reduces communication delays in a gaming machine network.

SUMMARY OF THE INVENTION

This invention addresses the needs indicated above by merging a gaming machine with a game server. The game server may be used to provide any number of network services to gaming machines including, for example, accounting, bonus game play, progressive game play, player tracking, game serving and game configuration to a group of gaming machine connected in a network. The gaming machines of this invention preferably employ one or more network components such as a game server, a concentrator, and a translator. The concentrator may be used to gather game information from a number of gaming machines connected in a loop or otherwise networked. The translator may be used to convert one communication protocol to another communication protocol for the transmission or interpretation of game information. The game information may be utilized by the game server to provide a game service. When used for game serving, the game server on one gaming machine allows a player or a casino to select a game from a list of games under the control of the game server for game play on another gaming machine.

One aspect of the present invention provides a gaming machine that can be generally characterized as including (1) a master gaming controller that controls a game played on the gaming machine, (2) a game server that provides one or more game services to a plurality of gaming machines within a network of gaming machines and (3) a communication interface connected to a network of gaming machines. Games played on the gaming machine may include slot games, video poker, video black jack, keno, and lottery. Game services provided by the game server may include progressive game play, bonus game play, accounting, game serving or game configuration.

In preferred embodiments, the game server may include (a) a microprocessor for performing game server functions, (b) a memory device storing game information from a plurality of gaming machines and (c) a memory device storing game information where the memory device is removable from the gaming machine. The game information stored on the memory device may be a number of games played, a number of wins, a number of losses, a game event, and an amount of money wagered for one or more gaming machines. In other embodiments, the game information is game coding instructions that allow a master gaming controller to present the game to a player on the gaming machine or the game information is game configuration information that configures a gaming machine for the game play of a particular game.

In preferred embodiments, the gaming machines in the network may be connected in one or more loops using fiber optic connections, wire connections, or wireless connections where the network may be a progressive game network, a casino area network or a bonus game network. The gaming machines may include a concentrator for gathering information from a plurality of gaming machine in the network of gaming machines and a translator that translates one communication protocol to another communication protocol. Typically, the game server is a component in at least one of the plurality of gaming machines in the gaming machine network.

Another aspect of the invention provides a method for providing game services to a group of gaming machines connected in a network using a gaming machine having a master gaming controller and a game server. The method may be characterized as including the following steps 1) communicating with one or more gaming machines on the gaming machine network wherein each gaming machine presents a game to a player playing a game on the gaming machine, 2) determining that a network gaming service is required for one or more gaming machines in the network and 3) executing a server operation to provide a network gaming service for one or more gaming machines in the network. Additionally, the method may include the steps of (a) sending a signal requesting game information to a plurality of gaming machines connected to the network, (b) receiving game information from one or more gaming machines connected to the network and (c) storing the game information from the plurality of gaming machines on the game server. The games played on the gaming machines may include slot games, video poker, video black jack, keno, and lottery. The game services provided by the game server may include game play, bonus game play, accounting, game serving or game configuration. The network may be a progressive game network, a bonus game network or a casino area network In preferred embodiments, the gaming machines may contain a concentrator for concentrating game information from a plurality of gaming machines and sending the game information to a translator or to a game server. Further, the gaming machines may contain a translator for translating game information from a plurality of gaming machines from one communication protocol to another communication protocol and sending the game information to a game server. The game information utilized by the game server, concentrator or translator may include a number of games played, a number of wins, a number of losses, a game event, and an amount of money wagered for one or more gaming machines.

Another aspect of the present invention provides a method for providing game serving to a group of gaming machines connected in a network using a gaming machine having a master gaming controller and a game server. The method may be characterized as including the following steps 1) displaying a list of games on a first gaming machine, 2) receiving a game selection signal for a game selection on the first gaming machine and 3) transmitting the game selection signal to a second gaming machine and 4) downloading coding instructions for the game selection to the first gaming machine from a game server on the second gaming machine wherein the coding instructions allow the master gaming controller on the first gaming machine to present the game selection to a player.

Another aspect of the present invention provides a method for providing game configurations to a group of gaming machines connected in a network using a gaming machine having a master gaming controller and a game server. The method may be characterized as including the following steps 1) configuring a first gaming machine to present a game 2)

storing the game configuration information to the game server on said first gaming machine 3) downloading game configuration information for the game to a second gaming machine from the game server on the first gaming machine wherein the game configuration information allows the master gaming controller on the second gaming machine to present the game on the first gaming machine.

These and other features of the present invention will be presented in more detail in the following detailed description of the invention and the associated figures.

DESCRIPTION OF THE PREFERRED EMBODIMENTS

Figure 1:
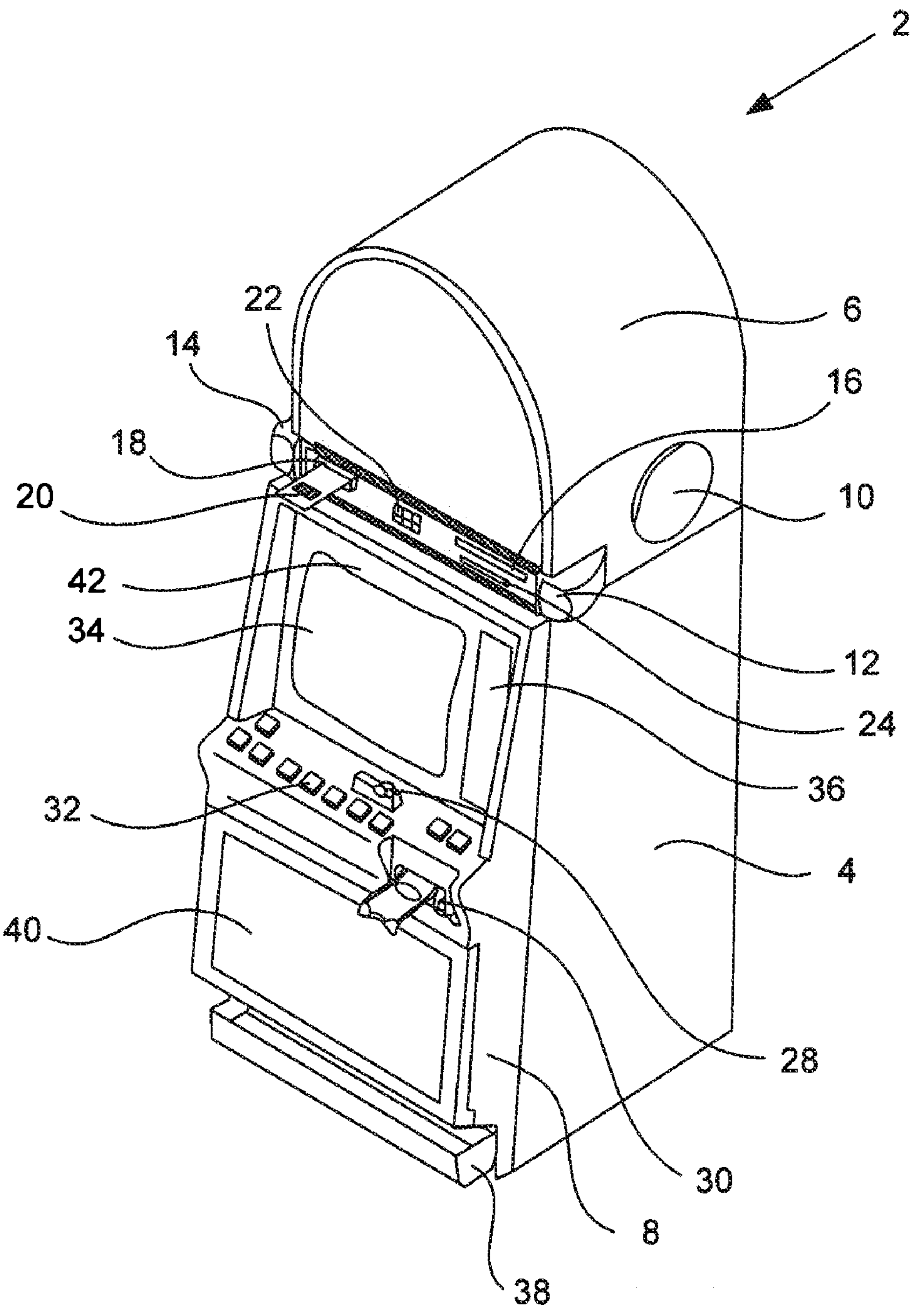
FIG. 1 is a perspective drawing of a gaming machine having a top box and other devices.

Turning first to FIG. 1, a video gaming machine 2 suitable for hosting a server of the present invention is shown. Machine 2 includes a main cabinet 4, which generally surrounds the machine interior (not shown) and is viewable by users. The main cabinet includes a main door 8 on the front of the machine, which opens to provide access to the interior of the machine. Typically, the main door 8 and/or any other portals which provide access to the interior of the machine utilize a locking mechanism of some sort as a security feature to limit access to the interior of the gaming machine. Attached to the main door are player-input switches or buttons 32, a coin acceptor 28, and a bill validator 30, a coin tray 38, a belly glass 40, and a monitor mask 42. Viewable through the main door is a video display monitor 34 and an information panel 36. The display monitor 34 will typically be a cathode ray tube, high resolution flat-panel LCD, or other conventional electronically controlled video monitor. Further, the video display monitor 34 may be a touch screen. The touch screen may respond to inputs made by a player touching certain portions of the screen. The information panel 36 is a back-lit, silk screened glass panel with lettering to indicate general game information including, for example, the number of coins played. The bill validator 30, player-input switches 32, video display monitor 34, and information panel are devices used to play a game on the game machine 2. The devices are controlled by circuitry (not shown) housed inside the main cabinet 4 of the machine 2. Many possible games, including traditional slot games, video slot games, video poker, video black jack, keno, video pachinko and lottery, may be provided with gaming machines of this invention.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information, a card reader 24 for entering a magnetic striped card containing player tracking information, and a video display screen 44. Further, the top box 6 may house different or additional devices than shown in the FIG. 1. For example, the top box may contain a bonus wheel or a back-lit silk screened panel which may be used to add bonus features to the game being played on the gaming machine. During a game, these devices are controlled, in part, by circuitry (not shown) housed within the main cabinet 4 of the machine 2. The top box 6 is designed to be removable from the machine 2. Typically, the top box 6 is replaced to repair a device within the top box 6 or to install a new top box 6 with a different set of devices.

Understand that gaming machine 2 is but one example from a wide range of gaming machine designs on which the present invention may be implemented. For example, some suitable gaming machines do not have top boxes or player tracking features. Further, some gaming machines are designed for bar tables and have displays that face upwards. Those of skill in the art will understand that the present invention, as described below, can be deployed on most any gaming machine now available or hereafter developed.

Returning to the example of FIG. 1, when a user wishes to play the gaming machine 2, he or she inserts cash through the coin acceptor 28 or bill validator 30. At the start of the game, the player may enter playing tracking information using the card reader 24, the keypad 22, and the florescent display 16. Further, other game preferences of the player playing the game may be read from a card inserted into the card reader. During the game, the player views game, information using the video display 34. Other game and prize information may also be displayed in the video display screen 44 located in the top box.

During the course of a game, a player may be required to make a number of decisions, which affect the outcome of the game. For example, a player may vary his or her wager on a particular game or make game decisions which affect the outcome of a particular game. The player may make these choices using the player-input switches 32, the video display screen 34 or using some other device which enables a player to input information into the gaming machine. During certain game events, the gaming machine 2 may display visual and auditory effects that may be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine, from lights on the top box 6 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

Figure 2:
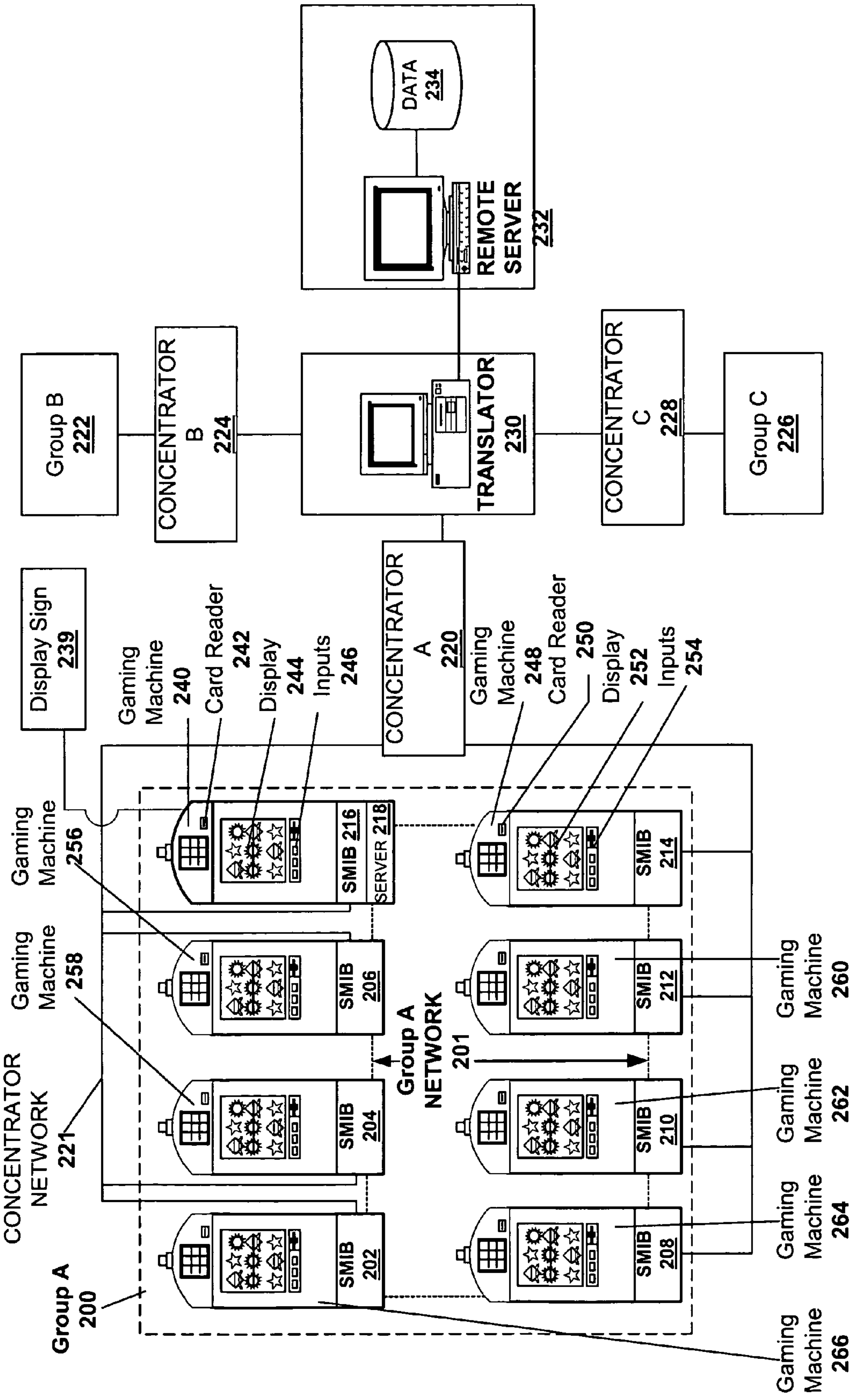
FIG. 2 is a block diagram depicting an example of a gaming machine with server capabilities connected to a network of gaming machines.

FIG. 2 is a block diagram depicting a specific example of a gaming machine network including at least one gaming machine with server capabilities. The network of gaming machines is comprised of three groups, group "A" 200, group "B" 222, and group "C" 226. Group "A" 200 contains eight gaming machines 240, 256, 258, 260, 262, 264, and 266 connected in a loop using the group "A" network 201. Group "B" and group "C" each contain two or more gaming machines (not shown) connected in a network loop.

The connection architecture for the gaming machines in each group is not limited to a loop. The gaming machines of group "A" 200, group "B" 222, and group "C" 226 may be connected in any topology that allows the gaming machines in each group to communicate and receive messages from at least one entity connected to the group that controls the information flow on the group network. Further, the network may employ various communications protocols such as Ethernet, token ring, FDDI, TCP, UDP, and various proprietary protocols.

The connections between gaming machines in a group network may utilize a number of different connection media including, for example, fiber, copper wire, wireless or combinations of these. Further, the media employed for each group of gaming machines may be different. For example, group "A" 200 may use a fiber optic connection, group "B" 222 may use a combination of fiber optics and wireless connections and group "C" 226 may use a wireless connection.

The gaming machines of group "A" 200 including machines 240, 256, 258, 260, 262, 264, and 266 are separately connected to a concentrator network 221 which is connected to a concentrator 220. The gaming machines 240, 256, 258, 260, 262, 264, and 266 are also connected to a second network, 201, with a distinct connection system separate from the connection system of the concentrator network 221. For communicating with the concentrator 220, each of the eight gaining machines of group "A" 200 contains a SMIB (SMart Interface Board) including SMIBs 202, 204, 206, 208, 210, and 212. The SMIB is a protocol board that enables communication between the gaming machine and the concentrator. The SMIBs in each gaming machine are connected to the concentrator network 221 and are not utilized in the group "A" network 201. Usually, a concentrator is used for a defined number of gaming machines that form a group that may be connected in a loop for example. More generally, a concentrator collects messages from an arbitrary group of nodes such as the gaming machines that form a local network or network segment and distributes messages to the same group of nodes from another source such as a remote server. At the hardware level, the concentrator may be used to reduce the number of wires in a network service system. For example, the concentrator "A" 220 may have as inputs eight separate wires from each of the SMIBs in gaming machines 240, 256, 258, 260, 262, 264, and 266 and output one wire which is connected to the translator 230. The wires from each of the eight gaming machines form the concentrator network 221. In the example of FIG. 2, the group "B" gaming machines are connected to the concentrator 224 and the group "C" 226 gaming machines are connected to the concentrator 228.

As mentioned, gaming machines may be connected by heterogeneous networks. In the example of FIG. 2, one such network is designated concentrator network 221 and another network is designated group "A" network 201. These separate networks connect the same set of group "A" gaming machines, but provide different network services to the machines. For example, network 221 may provide accounting services while the group "A" network 201 provides game serving. Multiple service networks connecting the same group of gaming machines is fairly common because of the manner in which gaming network services have evolved in the gaming industry. For example, initially, one network gaming service such as accounting was deployed on a group of gaming machines using a particular set of computers, concentrators, translators, communication protocols and connection system. Later, when another network gaming service such as progressive game play was deployed on a group of gaming machines with accounting network services, it was overlaid over the network providing accounting network services using a second set of computers, concentrators, translators, communication protocols and connection system rather than making the progressive game play service compatible with the infrastructure of the accounting network services. As the number of network game services has grown, the approach of adding a new separate infrastructure for each additional network gaming service has become quite cumbersome in terms of installation and maintenance of the total network infrastructure. Hence, the need for inventions that reduce the complexity of the network infrastructure.

The purpose of the concentrator is to gather information from multiple gaming machines and transmit it to another entity in the network. For example, concentrator "A" 220 gathers information from the eight gaming machines of group "A" and transmits it to a translator 230 which transmits it to a remote server 232. The translator 230 converts messages received in one communication protocol to a communication protocol which is understood by the remote server 232. The communication protocol used by each concentrator including 200, 224, and 228 may be different. Thus, concentrator "A" 220 may use a communication protocol which is different from either concentrator "B" 224 or concentrator "C" 228. Thus, one or more translators may be required to convert the communication protocols of the concentrators to the communication protocol of the remote server 232.

The remote server 232, which is usually a PC or mainframe, may direct the information flow on the gaming machine network. For example, when performing accounting functions, the remote server 232 may send polling messages to each gaming machine in the accounting network at regular intervals requesting game information including the number of games played, the amount of money deposited into the gaming machine, the amount of money dispensed from the gaming machine, the wins on the gaming machine, and the losses on the gaming machine. For each gaming machine, the information gathered by the remote server 232 may be used to provide an audit trail for accounting and security purposes. The remote server may store the gathered information from each gaming machine in a database 234.

As another example, the remote server 232 may provide gaming information services that allow progressive game play. For progressive game play, the remote server 232 may send polling messages at regular interval to all of the gaming machines in the progressive network requesting game information including whether a game has been initiated, the amount that has been bet and whether a jackpot has been won. When group "A" 200, group "B" 222, and group "C" 226 are part of the progressive network, the gaming machines in the each of the loops send the requested information to the remote server 232. The remote server 232 uses the information from the gaming machines to calculate a total jackpot for the gaming machines in the progressive network which is based on all of the money bet in the progressive network. The jackpot amount is usually reset after a win on one of the gaming machines in the progressive network. The remote server 232 sends messages containing the jackpot amount to the gaming machines and to one or more display signs including a sign 239. This information is used by the gaming machines and the display signs to display the amount of the progressive jackpot which is usually continually changing.

As another example, the remote server 232 may provide gaming information services that allow bonus game play. For bonus game play, the remote server 232 may send messages at regular interval to all of the gaming machines in the bonus network requesting game information including whether a game has been initiated, the amount that has been bet, and whether certain game events have occurred. When group "A" 200 is part of the bonus network, the gaming machines in network 201 send the requested information to the remote server 232. Group "A" 200, group "B" 222, and group "C" 226 may be part of the same bonus network, or they may form separate networks, or separate parts of them may form small bonus networks.

To determine when bonus play is initiated, the remote server 232 uses the information from the gaming machines to compare against a bonus procedure that may be implemented as a script for example. The bonus script may contain one or more gaming events sequences that initiate bonus game play. For example, a bonus script may include the instructions 1) when game event "A" occurs on any of the gaming machines in the bonus network initiate bonus play or 2) when the total amount wagered on all of the gaming machines in the bonus network exceeds a certain amount initiate bonus game play. For each bonus network, the gaming machine may follow the same bonus script or utilize a different bonus script. Thus, when group "A" 200, group "B" 222, and group "C" 226 are separate bonus networks, the game events that trigger a bonus game may be different for each group and bonus game play may be initiated at different times for each group. When bonus game play is initiated, the remote server 232 sends a message to the gaming machines to initiate game play and may send a message to a display sign including 239 indicating that bonus play has started.

Preferably, all network services are provided on a single network and use a single remote server. Given the heterogeneous nature of modern gaming machine networks, however, this is often unduly optimistic. Thus, to provide accounting, bonus game play, or progressive game play, a separate network and remote server is frequently used for each of the three gaming service. Thus, the accounting network, the bonus network and progressive network, described using the remote server 232, the translator 230, the concentrator 220 and the concentrator network 221 for illustrative purposes, may each use a similar network set-up. However, using the remote server 232, the translator 230, the concentrator 220, and concentrator network 221, only one of the three gaming services may be provided to group "A" 200. To provide all three gaming services to group "A" 200, three remote servers, three sets of network connections, three sets of concentrators, and three sets of translators are typically utilized. The hardware and connection schemes used to provide each gaming service may be different. Thus, the remote server used to provide accounting gaming services may be a mainframe computer while the remote server used to provide bonus gaming services may be a PC or workstation. Further, the connections, physical media, and communication protocols used in each gaming service network may be different.

The route a message travels over the network between a remote server and a gaming machine or between the gaming machine and the remote server is the communication path. The communication path of a message between a gaming machine and a remote server, depends on the configuration of the communication hardware between the remote server and the gaming machine and the communication protocol used by the remote server and the gaming machine. The delay time between when a message is sent from the remote server and when it is received by the target gaming machine is a function of the communication path and the type of communication hardware in the path. For conventional gaming machine networks in which communication paths with many nodes i.e. translators, concentrators, and multiple gaming machines, the delay time between the remote server and target machine may be as large as 2-3 seconds.

The remote server computer 232 may send messages to each gaming machine by broadcasting the message over the network. After passing through the translator and the concentrator, the message sent to each gaming machine may be received by one gaming machine and then forwarded to another gaming machine in the gaming network For example, when a message requesting information is received by the gaming machine 240 from the remote server 232, the gaming machine 240 may store the message and then forward the message to gaming machine 248 using the group "A" network 201. Then, gaming machine 248 may store the message requesting information and then forward the message to gaming machine "E" 260. Thus, the communication path for this message from the remote server 232 to the gaming machine 260 is the translator 230, the concentrator 220, the gaming machine 240, and the gaming machine 248. This process of receiving and forwarding messages may be repeated until all the gaming machines in the loop or chain receive the message from the remote server computer. The remote server computer may also broadcast messages to the gaming machines of group "B" 222 and group "C" 226.

When a gaming machine sends information to the remote server 232, the communication path between the gaming machine and the remote server may be the same or different as the communication path between the remote server and the gaming machine. The message may be sent directly to the concentrator and through the translator to the remote server or the message may be forwarded by a number of gaming machines before it reaches the concentrator. For example, when gaming machine 266 sends a message the remote server 232, the message may be sent to the concentrator "A" 220 via the concentrator network 221. Then, the concentrator "A" 220 sends the message to the translator "230" and the translator sends the message to the remote server 232. For this example, the communication path is the concentrator 220 and the translator 230. As another example, a message from the gaming machine 266 may be sent to gaming machine 258, gaming machine 258 may forward the message to gaming machine 256, gaming machine 256 may send the message to the concentrator "A" 220 via the concentrator network 221, the concentrator "A" sends the message to the translator "230" and the translator sends the message to the remote server 232. The communication path for this message is the gaming machine 258, the gaming machine 256, the concentrator "A" 220, and the translator 230.

In group "A" 200, Gaming machine "A" 240 contains a game server 218 which may provide gaming information services to the eight gaming machines of group "A" 200 including 240, 256, 258, 260, 262, 264, and 266. As described above, some examples of gaming services are accounting, bonus game play and game progressive play. The game server 218 may provide one or more of these gaming services. For example, the game server 218 might provide accounting, bonus game play and progressive game play services for the gaming machines of group "A" 200. Any necessary services not provided by game server 218 might be provided by server software running on remote server 232 for example. Preferably, the game server 218 performs gaming services in a manner similar to that described for remote server 232.

The game server 218 may be implemented as a separate hardware unit which may incorporated into the gaming machine or preferably as software using a microprocessor and memory devices utilized by the gaming machine 240 to present a game on the gaming machine 240. Further, as described in more detail with respect to FIG. 6, the gaming machine hardware may be augmented with additional hardware to provide the game server 218 functions. For example, additional memory storage devices may be added to the gaming machine 240 to implement the game server 218.

Figure 5:
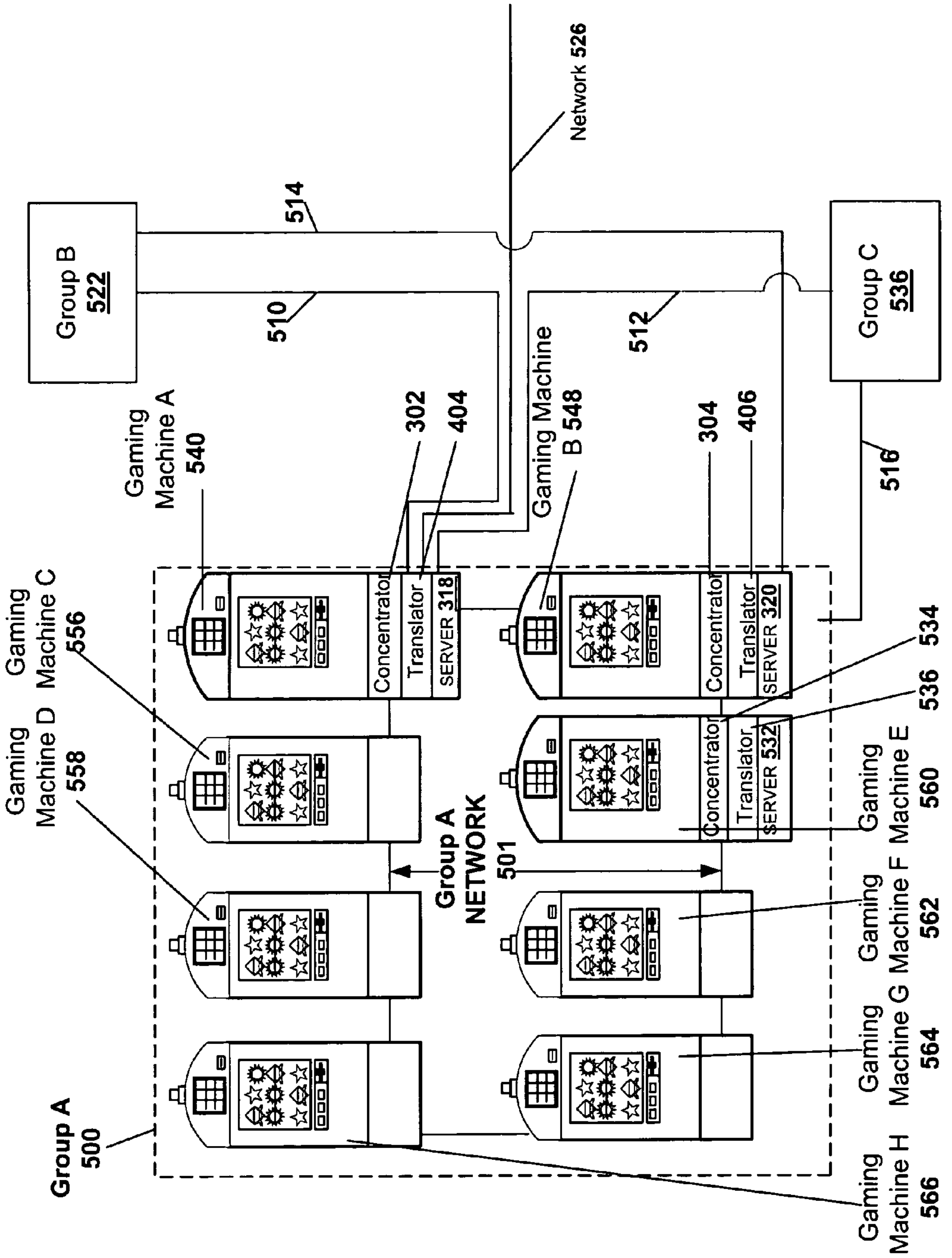
FIG. 5 is a block diagram depicting an example of a gaming machine with remote server, concentrator, translator capabilities connected in a network.

In FIG. 5, the use of a game server like a remote server 232 is described. The game server 218 may send messages requesting information from each gaming machine, receive messages containing game information from each gaming machine, and send message containing gaming instructions to each gaming machine to enable accounting, bonus game play, and progressive game play services. For example, when providing bonus game play services, the game server may poll each gaming machine in group "A" 200 for different game events such as a particular game outcome on one of the gaming machines. When a particular game outcome occurs on one of the gaming machine, the game server 218 may direct each gaming machine in the group to present a bonus game. The gaming machine server 218 may communicate with the other gaming machines of group "A" 200 using the group "A" network 201 and a communication board located in the gaming machine 240. In one specific embodiment, the group "A" network 201 is a fiber optic loop which as described above is separate from the concentrator network 221. Further, 239 for bonus game play and progressive play, the game server 218 may send messages and operating instructions to the display sign. However, in this example, unlike examples employing the remote server 232, the game server 218 does not provide accounting, bonus game play, and progressive game play services to the gaming machines of group "B" 222 or of group "C" 226.

Using the game server 218 and the gaming service network comprising the remote server 232, translator 230, concentrator 220 and concentrator network 221, multiple gaming services may be provided to the gaming machines of group "A" 200. For example, for group "A" 200, the gaming service network may be used to provide accounting services while the game server 218 may be used to provide bonus game play and progressive play. As another example, the gaming service network may be used to provide progressive game play while the game server 218 may be used to provide accounting and bonus game play. Extending this example to group "B" 222 and group "C" 226, a gaming machine with a game server may be utilized to provide bonus game play and progressive game play or some other combination of game services to each of these groups.

Using a game server to provide gaming services may eliminate some of the network infrastructure. For example, to provide bonus game play, accounting, progressive game play services for the group "A" 200 gaming machines, traditionally a separate network with a separate remote server, translator and concentrator is used for each gaming service. When the game server 218 provides bonus game play service and progressive game play service while the remote server 232 provides accounting service, two remote servers, two concentrators and two translators and their associated network connections may be eliminated. The elimination of this hardware may reduce the infrastructure and the maintenance costs needed to provide the progressive game play service and bonus game service to group "A" 200.

A local game server may also reduce the transfer time for messages between the game server and the gaming machines during a bonus game or other network activity. For example, to send a message from the remote server 232 to gaming machine 266, the message may pass through a translator, a concentrator, and gaming machines 240, 256 and 258. This communication path may result in a message transfer time of between 2-3 seconds. A delay of this magnitude may enable a player watching a group of gaming machines with bonus game play to participate only when a bonus game is offered. Usually, a bonus game is an additional award shared by all the players participating in the bonus game. Thus, when a player is able to time their game play to coincide with the bonus game, an award of some type is guaranteed to the player. Obviously, this game playing strategy negatively impacts casino operators. Using the game server 218 connected to a network, the message transfer time between the server 218 and any gaming machine connected to the group "A" network 201 may be significantly reduced to a level well below the 2-3 seconds that would allow unfair activity. Further, using the game server 218, the reduced message transfer time may enable bonus games where a game on one gaming machine connected to the server is affected in real-time by a game event on another gaming machine connected to the server.

In one implementation, game server software or firmware may be a standard feature in some or all network gaming machines. For example, in group "A" 200, gaming machines, including machines 240, 248, 256, 258, 260, 262, 264 and 266, may each contain a game server such as game server 218. However, the capabilities of all the game servers may not be utilized in each group of gaming machines. For example, in group "A", the gaming machine 240 with the server 218 may be used as the group server providing one or more game services to all of the gaming machines while the server capabilities in gaming machines 256, 258, 260, 262, 264, and 266 are not employed. When the server capabilities in a gaming machine are not employed, the gaming machine responds to requests for information and echo messages like a gaming machine without a server. As another example, when the gaming machine 256 contains a standard game server, the game server may be used to coordinate the information flow for various game services in group "A" 200 while the server capabilities in gaming machines are 240, 258, 260, 262, 264, and 266 are disabled. Other groups of gaming machines including group "B" 222 and group "C" 226 may utilize a gaming machine with a standard game server to provide one or more game services.

One advantage of providing a standard game server in each gaming machine may be a reduction in down-time when a game server is repaired. Currently, when a server is damaged or due for service, the gaming services provided by the server are lost while the server is repaired or inspected unless a back-up server is maintained for such situations. Acquiring and maintaining a back-up server is expensive. However, when a standard game server is employed in each gaming machine, another gaming machine may be quickly configured as the server while the server in the other gaming machine is repaired or the gaming machine is replaced. Thus, the redundancy provided by a group of gaming machines with standard game servers may reduce the down-time associated with repairing a damaged server and minimize the time where the gaming services provided by the game server are lost.

When a gaming machine is used a game server, the game server functions may be transparent to a game player using the gaming machine to play a game. For example, when gaming machine "A" with game server 218 is used as a game server for group "A", a player may use the card reader 242, the display 244 and inputs 246 to play a game. In the same manner, a player may use the card reader 250, display 252, and inputs to play a game on gaming machine 248 which is not affected by the game server. Thus, when playing a similar game on gaming machine "A" and gaming machine 258, a player may not notice differences in game play between the machines.

The game server 218 in gaming machine 240 may provide additional game services to the gaming machines of group "A" 200 including configuration services and game serving Configuring a gaming machine for game play is usually a time-consuming task. Typically, for each gaming machine that is configured, the configuration information is manually loaded by a machine operator. Some examples of configuration information include a current hopper limit, a credit limit, a jackpot limit, an enabled progressive limit. The configuration information may vary at different casino locations and may also vary between different gaming jurisdictions. This configuration process may be partially automated by using the game server 218 to store gaming configuration information. Once one gaming machine has been configured, the configuration information may be stored on the game server 218 on gaming machine 240. Further, a number of different gaming machine configurations may be stored on the game server 218. When a gaming machine requires configuration, the stored configuration information may be transmitted from the game server 218 to the gaming machine. For example, in group "A", configuration information for a type of video slot machine may be stored on the server 218. To configure the gaming machines 256, 258, 260, 262, 264, and 266 as the same type of video slot machine, the configuration information from the game server 218 is transmitted automatically to each gaming machine. Thus, the amount of manual gaming configuration work may be reduced.

As mentioned, the server 218 may also provide game serving. With game serving, the code containing the instructions used by a gaming machine to provide game play for a particular game is stored on the game server 218. A gaming machine may have the capability to provide game play for a number of games. For example, one video slot machine including 240, 256, 258, 260, 262, 264, and 266 may have the capability to present 5 different types of video slot games. Using the game server 218, the coding instructions for the slot games as well as the gaming machine configuration information may be stored on the game server 218. To change a game on any of the gaming machines, a machine operator may send instructions to the game server 218 to download a new game and game configuration information to one or more gaming machines. After downloading the new game and the gaming configuration information from the game server to the gaming machine, the gaming machine provides the game play for the selected game. An advantage of using a game server, including 218, is reduced maintenance time to update games on a gaming machine. For example, when a master game copy is updated on the game server, the gaming machines connected to the game server with game serving may automatically download the updated version. In the past, the games on the gaming machine have been updated manually for each gaming machine, which is a time consuming process.

In some implementations of game serving on a game server, a player playing a game on a gaming machine may be able to select a particular game for game play from a list of games. For example, a player playing a game on gaming machine 248 may select a game from a game list displayed on the video display 252 using the inputs 254. The video display 252 may display a name of the game, a pay table, a game sequence or other information for each game on the list. A signal with the game requested by the player is sent to the game server 218 where the coding instructions that enable a gaming machine to present the selected game are stored. The game server 218 downloads the requested game instructions to the gaming machine 248 from the master copy stored on the game server enabling the gaming machine "B" to provide the selected game play to the player. For implementing game serving as a gaming service, one requirement may be a fast download speed. Thus, a high bandwidth connection between the game server and the gaming machine is needed. For example, the group "A" network 201 may use a fiber optic connection scheme to provide the information transfer rate needed to utilize the game server 218 as a host for game serving.

Figure 3:
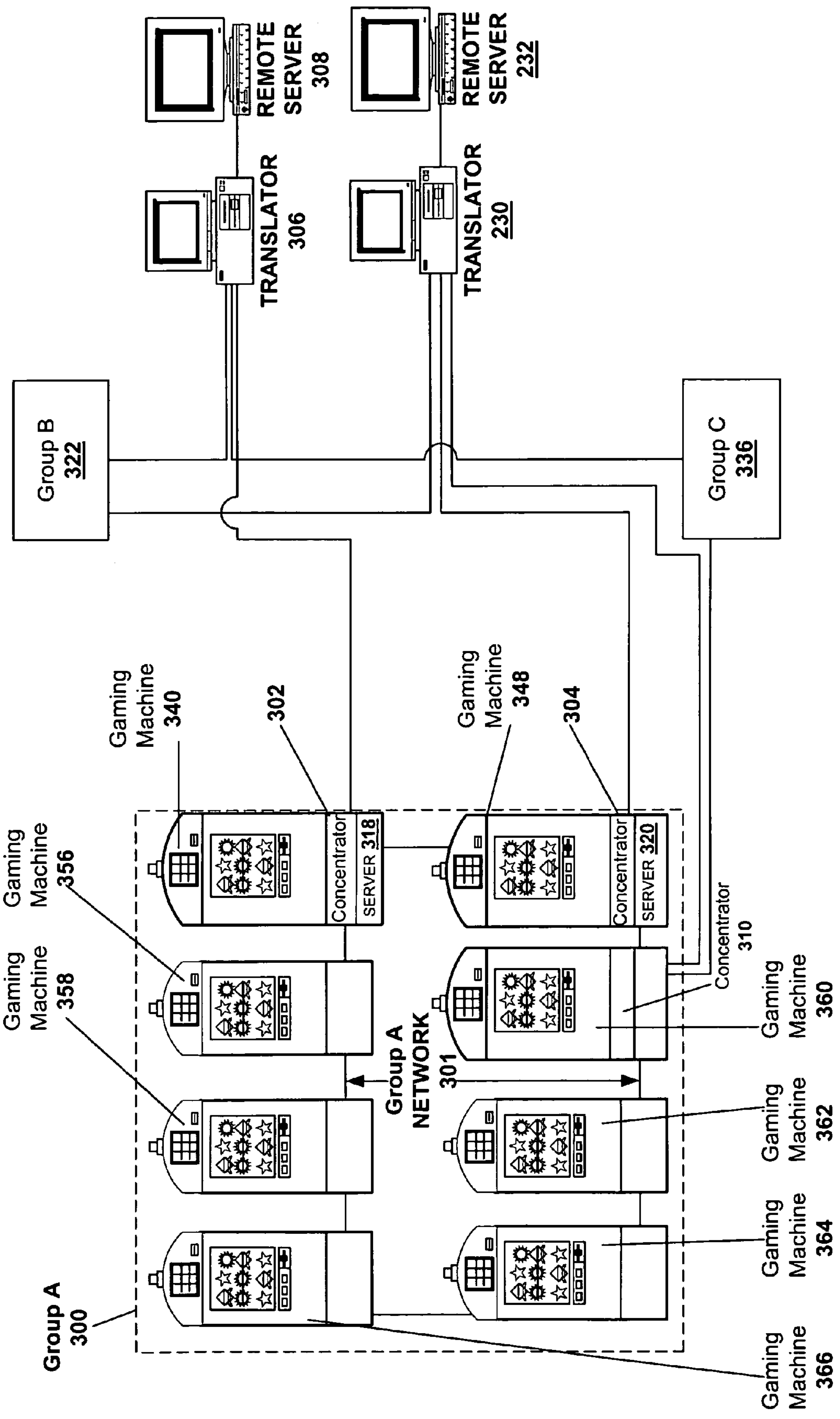
FIG. 3 is a block diagram depicting an example of a gaming machine with server and concentrator capabilities connected in a network to a separate remote server.

FIG. 3 is a block diagram depicting an example of a gaming machine with server and concentrator capabilities connected in a network to a separate remote server. The remote server 232 and translator 230 (previously described in reference to FIG. 2) are connected to three groups of gaming machines including group "A" 300, group "B" 322, and group "C" 336. Group "A" 300 is comprised of eight gaming machines including gaming machine 340, gaming machine 348, gaming machine 356, gaming machine 358, gaming machine 360, gaming machine 363, gaming machine 364, and gaming machine 366. Group "B" 322 and Group "C" 336 may be comprised of two or more gaming machines per group.

As described with reference to FIG. 2, the remote server 232 and translator 230 may provide one or more gaming services such as progressive game play, bonus game play, or accounting to the gaming machines of group "A" 300, group "B" 322, and group "C" 336. A second remote server 308 and second translator 306 provides one or more other gaming services to group "A" 300, group "B" 322, and group "C" 336. Using a remote server and translator configuration, one remote server and one translator may be required for each gaming service. To provide 3 gaming services may require three separate remote servers and three separate translators. Thus, the remote server 232 and the remote server 308 may provide two gaming services. For example, remote server 232 and translator 230 provide accounting services while remote server 308 and translator 306 may provide progressive game play to each of the gaming machines in the three groups. In an alternative embodiment, one of the remote servers provides two or more services.

In group "A" 300, gaming machine "A" 340 contains a game server 318 and a concentrator 302, gaming machine "B" 348 contains a game server 320 and a concentrator 304 and gaming machine "E" 360 contains a concentrator 308. In one implementation of this invention, other gaming machines may contain game servers and concentrators. Thus, one or more of gaming machines 356, 358, 360, 362, 364 and 366 may contain game servers and concentrators and the gaming machines of group "B" 322 and of group "C" 336 may contain game servers and concentrators. However, in each gaming machine, the game servers and concentrators capabilities may not necessarily be utilized. Further, the concentrator may be implemented as a separate hardware device but preferably is implemented as software on each gaming machine using the gaming machine hardware used to present a game on the gaming machine.

As described with reference to FIG. 2, for gaming machines connected in a local network, a server, such as server 318 or server 320, may provide one or more gaming services including bonus game play, progressive game play, accounting, game configurations, and game serving. Thus, the game servers 318 and 320 may provide one or more gaming services to the gaming machines of group "A" 300 using the group "A" network 301 including the gaming machines 340, 348, 356, 358, 360, 362, 364 and 366. For example, the game server 318 may provide game serving while the game server 320 may provide bonus game play and progressive game play services to the gaming machines of group "A" 300. As another example, for the gaming machines of group "A" 300, the game server 320 may provide game serving, bonus game play and progressive game play and the game server 318 may provide no gaming services.

An advantage of providing multiple gaming services from a single game server, such as server 318 or server 320 in FIG. 3 or server 218 in FIG. 2, is that the amount of message traffic may be reduced because some game information sent over the network in a single message may be used for more than one game service. Additionally, the advantage may be realized when using a remote server that provides 2 or more gaming services. This advantage can be realized if the two services share the same format and/or communication protocol. Otherwise a translator may be required. For example, the credits bet on a number of gaming machines may be used to provide accounting services and bonus game play services. When the game server 318 is used to provide both of these services, a message requesting the credit information is sent only once by the game server 318 to each gaming machine. When the remote server 308 provides accounting services and the remote server 232 provides bonus game play, a message requesting credit information is sent by the remote server 308 and the remote server 232 to each gaming machine. Thus, each gaming machine transmits the requested information twice. For example, when remote server 232 request credit information, gaming machine 362 sends the credit information to remote server 232 over the remote server 232 network. When remote server 308 requests the credit information, gaming machine 362 sends the credit information to remote server 308 over the remote server 308 network.

In group "A" 300, three gaming machines have active concentrators. As described with reference to FIG. 2, a concentrator is used to gather gaming information from a number of gaming machines connected in a local network or network segment. For example, a concentrator used for accounting may gather information including metering information, games won, games lost, and credits from a plurality of gaming machines. In FIG. 3, the concentrator 302 receives game information from all of the gaming machines of group "A", including the gaming machine 340 in which the concentrator 302 resides, and transmits the information to the translator 306 and the remote server 308. The game information from the concentrator 302 is usually in response to game information requests from the remote server 308 pertinent to the game service provided by the remote server 308. Concentrator 302 may also collect messages for presentation to server 318.

For the remote server 232, the concentrator 304 receives game information from the gaming machines of group "A" and transmits the information to the translator 230 and the remote server 232. The concentrator 310 in gaming machine 360 in group "A" 300 receives information from group "C" 336 and transmits the information to the translator 230 and remote server 232. In this example, a concentrator 310 located in a gaming machine in group "A" is being used to gather information from gaming machines in group "C" 336. Another concentrator which may be present in group "C" 336, and may be located in a gaming machine or as a separate device, sends game information from the gaming machines of group C. A separate concentrator in group C is only necessary if concentrator 310 cannot provide all the necessary information to translator 230.

Further in the example of FIG. 3, group B communications may employ two concentrators, each in separate gaming machine in group "B" 322. These concentrators send separate gaming information from the gaming machines of group "B" to the remote servers 308 and 230.

Using gaming machines with concentrators, including concentrators 302 and 304, the concentrator network (see FIG. 2) and SMIBs in each gaming machine used to talk to the concentrators may be eliminated for group "A" 300. The SMIBs are eliminated when game information previously gathered by each SMIB and transmitted to a loop concentrator for a particular game service (as shown in FIG. 2) is now transmitted by the gaming machines in group "A" 300 over the group "A" network 301 to the concentrators 302 and 304. To send messages to the concentrator sand receive messages from the concentrators, the gaming machines require some type of communication interface and protocol. Preferably, this communication protocol for communicating with the concentrators is implemented in software on each gaming machine and does not require additional hardware. The elimination of the concentrator network and the SMIBs reduces the complexity of the network structure and may reduce infrastructure and maintenance costs. For small gaming establishments, the potential reduction in the maintenance costs and the infrastructure costs using gaming machines with standard servers and concentrators may enable these establishments to provide gaming services previously considered prohibitive because of the relatively high costs of providing these services.

Figure 4:
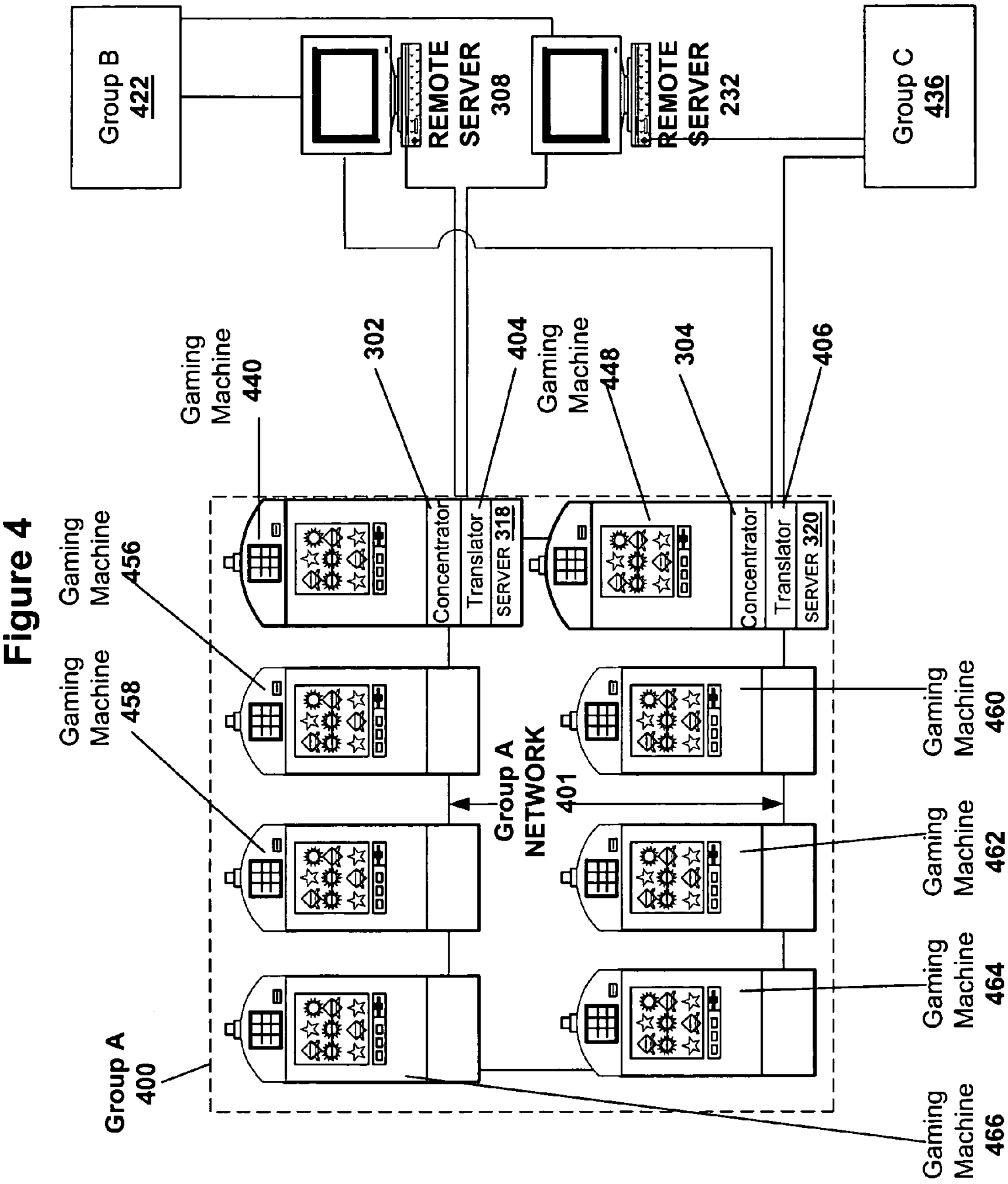
FIG. 4 is a block diagram depicting an example of a gaming machine with server, concentrator, and translator capabilities connected in a network to separate remote server machine.

FIG. 4 is a block diagram depicting an example of a gaming machine with server, concentrator, and translator capabilities connected in a network. As described with reference to FIG. 3, two remote servers may each provide one gaming service including bonus game play, progressive game play or accounting. For example, for group "A" 400, group "B" 422, and group "C" 436, remote server 308 may provide progressive game play services and remote server 232 may provide accounting services. Group "A" 400 is composed of eight gaming machines including a gaming machine 440, a gaming machine 448, a gaming machine 456, a gaming machine" 458, a gaming machine 460, a gaming 462, a gaming machine 464, and a gaming machine 466. Group "B" 422 may be composed of two or more gaming machines and Group "C" may also be composed of two or more gaming machines.

Gaming machine 440 contains game server 318 and concentrator 302 as in FIG. 3. In addition, it includes a translator 404. The translators, including 404, may be implemented as a separate hardware device but preferably is implemented as software on each gaming machine using the gaming machine hardware used to present a game on the gaming machine. Gaming machine 448 contains game server 320 and the concentrator 304 as in FIG. 3. In addition, it includes a translator 406. The game server, the concentrator, and the translator may be standard components in each gaming machine in group "A" 400 as well as the gaming machines of group "B" 422 and of group "C" 436. For illustrative purposes, these three parts are identified in gaming machine 440 and gaming machine 448. As described with reference to FIG. 3, the game server 318 and the game server 320 may each provide one or more game services including bonus game play, progressive game play, accounting, game configuration and game serving. Further, the concentrator 302 and the concentrator 304 may gather game information from a number of gaming machines. The eight gaming machines of group "A" 400 are connected using a fiber optic loop, for example, to form a Group "A" network 401. Using the group "A" network 401, gaming machines of group "A" may send and receive messages containing game information from the game servers 318 and 320 and the remote servers 232 and 308.

As with the embodiments described above, many different gaming services may be provided with the game service network and the associated hardware in FIG. 4. For illustrative purposes, an implementation of one set of services is described for the hardware shown in FIG. 4. However, the types of game services and potential implementations are not limited to the following example. In this example, the remote server 308 provides progressive game services and the remote server 232 provides accounting services. In group "B" 422, a translator (not shown) transmits accounting information to the accounting remote server 232 and receives accounting information requests from the remote server 232 to the gaming machines of group "B". Further, for the gaming machines of group "B" 422, a translator (not shown) transmits progressive game play information to the progressive game play remote server 308 and receives progressive game play information and instructions. The accounting and progressive game play information are concentrated from the gaming machines in group "B" using concentrators (not shown) which may reside in each gaming machine. In group "C" 436, a gaming machine (not shown) with a concentrator and a translator transmits accounting information to remote server 232 and a concentrator (not shown) transmits progressive game play information to the translator 406 in gaming machine 448 of group A. The progressive game play information from group "C" 436 is transmitted from the translator 406 to the progressive game play remote server 308. The progressive game play remote server 308 also transmits messages to the gaming machines of group "C" 436 through the translator 408.

The concentrator 304 gathers accounting information for the gaming machines of group "A" 400 and transmits the messages via the group "A" network 401 to the translator 404 in gaming machine 440. The translator 404 transmits the accounting information to accounting remote server 232. For the gaming machines of group "A" 400, the concentrator 302 in gaming machine 440 gathers progressive game play information and transmits the information to the progressive game play remote server 308 using the translator 404. Note that in this example group "A" has one translator (translator 404) and two concentrators (concentrators 302 and 304), one for each of the remote servers 232 and 308. Note also that translator 404 serves as the group "A" translator and translator 406 serves as the group "C" translator.

The game server 318 provides game serving services for group "A" 400. The game server 318 transmits and receives game serving information/services using the group "A" network 401. The game server 320 provides game configuration services to group "A" 400. Game configuration information is transmitted from the game server 320 to the eight gaming machines of group "A" 400 using the group "A" network 400.

FIG. 5 is a block diagram depicting an example of gaming machines with remote server, concentrator, and translator capabilities for all services provided to multiple gaming machine networks or network segments. Three groups of gaming machines including group "A" 500, group "B" 522 and group "C" 536 provide various game playing opportunities to players wishing to play a game on a gaming machine. Group "A" 500 is composed of eight gaming machines including gaming machines 540, 548, 556, 558, 560, 562, 564, and 566. Group "B" 522 may be composed of two or more gaming machines and Group "C" 536 may be composed of two or more gaming machines.

Gaming machine 540 contains the game server 318, the concentrator 302, and the translator 404. Gaming machine 548 contains the game server 320, the concentrator 304, the translator 406. In groups "A", "B", and "C", the game server, the concentrator, the translator may be standard components in each gaming machine. For illustrative purposes, these three parts are identified in gaming machine "A" 540, gaming machine "B" 548, and gaming machine "E" 560. As described with reference to FIGS. 2 and 3, game servers including 318, 320 and 532 may each provide a number of gaming services including bonus game play, progressive game play, accounting, game configuration and game serving for gaming machines typically connected in a local network As described with reference to FIGS. 3 and 4, the concentrators including 302, 304 and 534 typically gather game information from a number of gaming machines connected in a local network or network segment and transmit it to a remote server. As described with reference to FIG. 4, the translators including 404, 406 and 536 translate communication protocols to allow communication between a concentrator and a remote server.

In FIG. 5, some of the game servers, including 318, 320 and 532, are configured to act as remote servers such as 232 in FIG. 2 or 308 in FIG. 3. Thus, the game servers including 318, 320 and 532 may provide gaming services to gaming machines outside the group "A" network 501. In FIGS. 2, 3, and 4, the game servers also have remote server capabilities. However, in the hardware implementations described in FIGS. 2, 3, and 4, this remote server capability was not described.

Many different gaming services may be provided with the game service network and the associated hardware in FIG. 5. For illustrative purposes, the implementation of one set of game services is described for the hardware shown in FIG. 5. The eight gaming machines of group "A" 500 may be connected using a fiber optic loop to form a Group "A" network 501. Using the group "A" network 501, the gaming machines of group "A" including gaming machines 540, 548, 556, 558, 560, 562, 564 and 566 may send and receive messages containing game information from the game servers 318, 320 and 532. The game server 318 and the game server 320 are configured to act as a remote game servers and provide game services to gaming machines from different groups including group "B" 522 and group "C" 536 as well as group "A" 500.

In the current example, the game server 318 provides accounting services to group "A" 500, group "B" 522 and group "C" 536. The game server 318 transmits requests for accounting information to the gaming machines in each of the groups. Additionally, the game server 318 may communicate with entities connected to the network 526. The gaming machines in each group transmit the requested information to the game server 318 through various connections. For example, the gaming machines of group "A" transmit accounting information to the concentrator 302 in group "A" 500 using the group "A" network 501. The concentrator 302 transmits the accounting information from the gaming machines in group "A" to the accounting game server 318. The gaming machines of group "B" 522 transmit accounting information to a concentrator (not shown) in a group "B" gaming machine. The concentrator in group "B" transmits accounting information to the translator 404 in gaming machine 540 via a connection 510 between concentrator and the gaming machine 540. The translator 404 transmits the accounting information to the accounting game server 318. The gaming machines of group "C" 536 transmit accounting information to a concentrator (not shown) in a gaming machine in group "C" which transmits the concentrated accounting information to a translator (not shown) in a gaming machine in group "C". The translator in group "C" 536 transmits accounting information to the gaming server 318 in gaming machine "A" via a connection 512 between the group "C" translator and the gaming machine "A" 540.

The game server 320 provides progressive game play services to group "A" 500, group "B" 522 and group "C" 536. The game server 320 transmits requests for progressive game play information to the gaming machines of groups "A", "B" and "C". For example, using the remoter server capabilities in game server 320, information or instructions, including the current progressive jackpot and requests for game information, may be sent to each gaming machine of groups "A", "B", and "C". The gaming machine in each group may send the requested game information to the game server 320 through various connections. Further, the game server 320 may obtain some of the game information needed for progressive game play from the accounting game server 318 via communication on the group "A" network 501.

The gaming machines of group "A" transmit progressive game play information to the concentrator 534 in gaming machine 560 using the group "A" network 501. The concentrator 534 transmits the progressive game play information from the gaming machines of group "A" to the progressive game play server 320 in gaming machine 548 using the group "A" network 501. The gaming machines of group "B" 522 transmit progressive game play information to a concentrator (not shown) in a gaming machine located in group "B" 522 which transmits the information to a translator (not shown) in a gaming machine in group "B" 522. The translator in a gaming machine in group "B" 522 transmits the progressive game play information to game server 320 in gaming machine 548 via a connection 512 between the group "B" translator and the gaming machine 548. The gaming machines of group "C" 536 transmit progressive game play information to the concentrator 304 in gaming machine 548 via connections 516 between the group "C" gaming machines and the concentrator 304. The concentrator 304 transmits the progressive game play information to the progressive game play server 320.

The game server 532 in gaming machine 560 provides game serving, bonus game play, and game configuration services to the gaming machines of group "A" 500. The game server transmits gaming information and instructions and receives gaming information using the group "A" network 501. In this example, the remote server capabilities of game server 532 in gaming machine 560 are not utilized.

Figure 6:
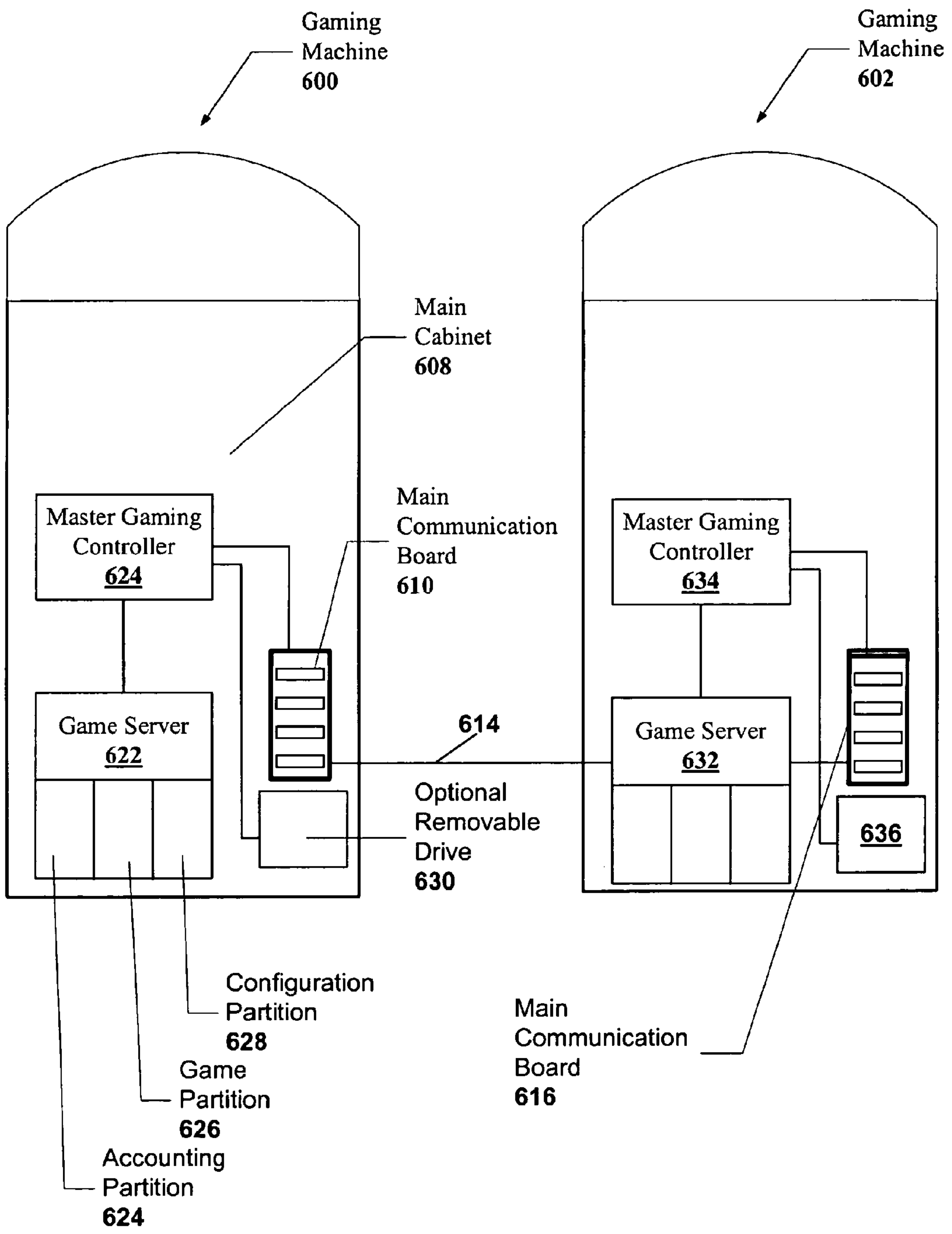
FIG. 6 is a block diagram depicting an example of two gaming machines with a game server connected to provide gaming services

FIG. 6 is a block diagram depicting an example of two gaming machines, a gaming machine 600 and a gaming machine 602, each configured with a standard server for connection in a network. The gaming machine 600 and the gaming machine 602 each contain a standard game server including the game server 622 and the game server 632. The game server 622 in gaming machine 600 provides game configuration, game serving and game accounting services to the gaming machine 600 and the gaming machine 602. In this example, the game server 632 in gaming machine 602 is not utilized to provide gaming services. The game server 622 may run on its own microprocessor to perform various game service operations or a microprocessor on the master gaming controller may be used for game service operations. The game server functions, the concentrator functions and translator functions may be provided by software residing on each gaming machine. The communication functions that may be needed for the game server functions, the concentrator functions and the translator functions may be provided using the main communication boards, 610 and 616 on each gaming machine.

Although gaming machine 600 is used as a game server and gaming machine 602 is not used as a game server, game play on both gaming machines is intended to be similar. Thus, a player playing a video slot game on gaming machine 600 and then a video slot game on gaming machine 602 would not be able to distinguish that one gaming machine is being used as a game server and the other gaming machine is not being used as a game server from comparing the game play on each machine. For example, the game play on the gaming machine 600 would not be noticeably slower then the game play on the gaming machine 602 when the gaining machine 600 is used as a game server.

A disk drive associated with the game server 622 is configured with three partitions to store the game information or the game instructions needed to provide each game service. For example, the accounting partition 624 may store the number of games played, the wins and the losses for the gaming machines 600 and 602, etc. The game serving partition 626 may store the game instructions for one or more of the games utilized by a master gaming controller 624 or a master gaming controller 634 to present a game on the gaming machine 600 or 602. The configuration partition 628 may contain the configuration information needed to initially configure a gaming machine to play a new game. To provide additional game services more partitions may be created on the hard drive.

An optional removable drive such as a drive 630 and a drive 636 may be included with the gaming machines to enhance the capabilities of the game server 622. The removable drive 630 may be used to provide additional game services. For example, the removable drive might be configured to provide progressive game play and bonus game play for a number of gaming machines. Additionally, the removable drive may be used to update information on the game server 622. For example, when the optional drive 630 contains a new set of games for game serving, the games may be transferred from the removable drive 630 to the game serving partition 626 on the game server 622. As another example, the optional removable drive may be used as a back-up for storing critical game information including accounting information and access events to the gaming machine.

The communication operations between the game server 622 and one or more gaming machines including 602 is directed by the master gaming controller 624. Generally, any form of network communications interface that supports the necessary network protocols may be employed in the gaming machines. For example, if the network employs an Ethernet protocol, then the network interface should support Ethernet, if the network employs an FDDI protocol, then the network interface should support FDDI, and if the network employs a proprietary protocol, then the network interface should support that protocol. In the example of FIG. 6, the network interface includes a main communication board 610. Using the main communication board 610 and a connection 614 between the main communication board 610 and the main communication board 616, the master gaming controller 624 may transmit messages containing game information or game instructions used for providing one or more game services to the gaming machine 602 and receive game information required to provide a particular game service from the gaming machine 602. These communication operations may be extended to a plurality of gaming machines connected in some manner to the gaming server 622.

Figure 7:
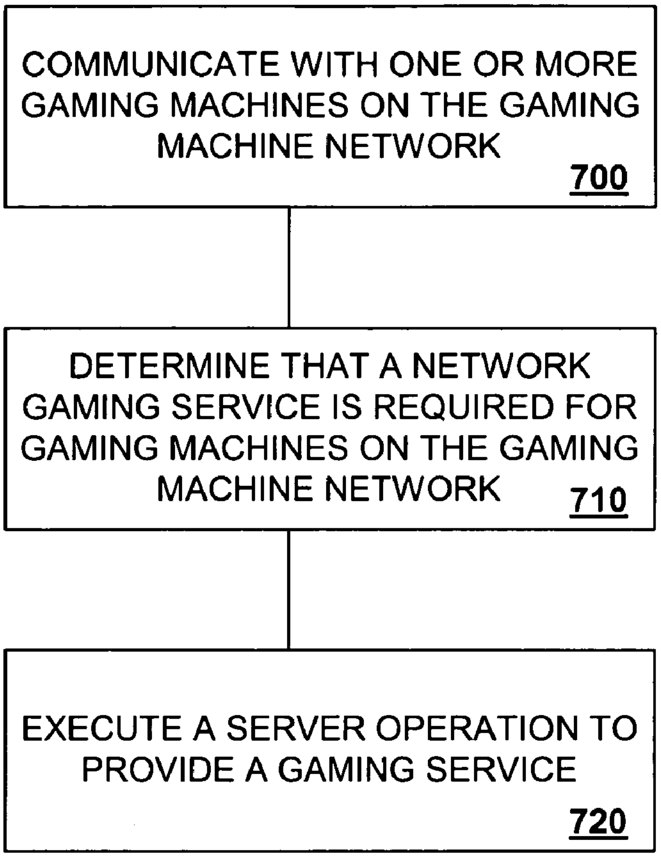
FIG. 7 is a flow diagram depicting a method for providing one or more network game services to a group of gaming machines using a gaming machine with a game server.

FIG. 7 is a flow diagram depicting a method for providing one or more network game services to a group of gaming machines using a gaming machine with a game server. In step 700, a gaming machine with a game server communicates with one or more gaming machines on the gaming machine network. The communications from the game server may be messages requesting game information from one or more gaming machines including the gaming machine on which the server resides. For example, the game information request to a gaming machine may ask for the number games played on the machine or whether the game is currently being played or not. From the game information received from the one or more gaming machines, in step 710, the game server determines that a network gaming service is required for one or more gaming machines on the gaming machine network. For example, from polling a number of gaming machines linked together for bonus game play, the game server may determine that a number of events on the bonus gaming machines have triggered a bonus game event. After determining a network gaming service is required, the gaming server may execute a server operation to provide a network gaming service in step 720. For example, when the game server determines that a bonus game event is required, the game server may send an instruction to the gaming machines in a bonus group instructing each gaming machine to present a bonus game.

Although the foregoing invention has been described in some detail for purposes of clarity of understanding, it will be apparent that certain changes and modifications may be practiced within the scope of the appended claims. For instance, while the gaming machines of this invention have been depicted as having a display screen physically viewed through a vertical glass panel attached to a main gaming machine cabinet, the use of gaming devices in accordance with this invention is not so limited. For example, the display screen features may be provided on a table top gaming machine where the display screen is viewed through a horizontal glass panel.

What is claimed is:

1. A gaming machine comprising:

a housing;

a master gaming controller coupled to the housing configured to control a game played on the gaming machine;

a display coupled to the housing and configured to display the game controlled by the master gaming controller;

one or more input devices coupled to the housing for accepting indicia of credit, wherein the indicia of credit are for making wagers on the game played on the gaming machine;

a first game server configured to provide one or more gaming services to a first plurality of gaming machines in a first network and to a second plurality of gaming machines in a second network, wherein the one or more gaming services are selected from the group consisting of progressive game play, bonus game play, accounting services, game serving, and game configuration;

a communication interface configured to communicate with the first plurality of gaming machines via the first network;

wherein the first game server is configured to do the following:

send at least one request for gaming information to the first and second pluralities of gaming machines, the gaming information including a first portion and a second portion, and receive at least the first portion of the gaming information from at least one of the first plurality of gaming machines via the communication interface;

a concentrator configured to do the following:

communicate with the second plurality of gaming machines via the second network, receive a least the second portion of the gaming information from at least two of the second plurality of gaming machines, combine the information from the at least two of the second plurality of gaming machines to generate a combined second portion, and provide the combined second portion of the gaming information to the first game server; and a translator configured to do the following:

communicate with the second plurality of gaming machines via the second network, translate the gaming information between two communication protocols, wherein the first plurality of games is compatible with the first communication protocol, and the second plurality of games is compatible with the second communication protocol, send the gaming information to the first game server using the first protocol, and send the gaming information to a second game server located on a remote gaming machine of the second network using the second protocol, wherein the first game server is further configured to provide the gaming services to the first plurality of gaming machines using the gaming information, including the first portion, the second portion, or a combination thereof.

2. The gaming machine of claim 1, wherein the first game server is further configured to:

communicate with the second plurality of gaming machines via the second network; and provide the gaming services to the second plurality of gaming machines using the gaming information, including the first portion, the second portion, or a combination thereof.

3. The gaming machine of claim 1, wherein the first game server is further configured to receive the first portion of the gaming information from a third game server located on a second gaming machine of the first network.

4. The gaming machine of claim 1, wherein the game played on the gaming machine is selected from the group consisting of slot games, video poker, video black jack, keno, and lottery.

5. The gaming machine of claim 1, wherein at least two gaming machines in the first plurality of gaming machines are connected in at least one loop.

6. The gaming machine of claim 1, wherein gaming machines in the first plurality of gaming machines are connected using fiber optic connections, wire connections, or wireless connections.

7. The gaming machine of claim 1, further comprising a memory device storing the gaming information wherein the memory device is removable from the gaming machine.

8. The gaming machine of claim 1, wherein the gaming information includes a number of games played, a number of wins, a number of losses, a game event, an amount of money wagered for one or more gaming machines, or a combination thereof.

9. The gaming machine of claim 1, wherein the gaming information includes game coding instructions that allow a master gaming controller to present the game to a player on the gaming machine.

10. The gaming machine of claim 1, wherein the gaming information includes game configuration information that configures the gaming machine for game play of a particular game.

11. A method for providing gaming services to a group of gaming machines connected in a network, the method comprising:

providing a gaming machine comprising i) a housing; ii) a master gaming controller coupled to the housing designed or configured to control a game played on the gaming machine; iii) a display coupled to the housing for displaying the game controlled by the master gaming controller; iv) one or more input devices coupled to the housing for accepting indicia of credit wherein the indicia of credit are for making wagers on the game played on the gaming machine; v) a first game server configured to provide one or more gaming services to a first plurality of gaming machines in a first network and to a second plurality of gaming machines in a second network; and vi) a communication interface connected to the first network of gaming machines, wherein the one or more gaming services are selected from the group consisting of progressive game play, bonus game play, accounting services, game serving, and game configuration;

communicating with the first plurality of gaming machines via the first network;

sending at least one request for gaming information to the first and second pluralities of gaming machines, the gaming information including a first portion and a second portion;

receiving at least the first portion of the gaming information from at least one of the first plurality of gaming machines via the communication interface;

communicating with the second plurality of gaming machines via the second network;

receiving a least the second portion of the gaming information from at least two of the second plurality of gaming machines, combining the information from the at least two of the second plurality of gaming machines to produce a combined second portion;

providing the combined second portion of the gaming information to the first game server;

translating the gaming information between two communication protocols, wherein the first plurality of games is compatible with the first communication protocol, and the second plurality of games is compatible with the second communication protocol;

sending the gaming information to the first game server using the first protocol;

sending the gaming information to a second game server located on a remote gaming machine of the second network using the second protocol; and providing the gaming services to the first plurality of gaming machines using the gaming information, including the first portion, the second portion, or a combination thereof.

12. The method of claim 11, further comprising:

communicating with the second plurality of gaming machines via the second network; and providing the gaming services to the second plurality of gaming machines using the gaming information, including the first portion, the second portion, or a combination thereof.

13. The method of claim 11, further comprising receiving the first portion of the gaming information from a third game server located on a second gaming machine of the first network.

14. The method of claim 11, wherein the game played on the gaming machine is selected from the group consisting of slot games, video poker, video black jack, keno, and lottery.

15. The method of claim 11, wherein at least two gaming machines in the first plurality of gaming machines are connected in at least one loop.

16. The method of claim 11, wherein gaming machines in the first plurality of gaming machines are connected using fiber optic connections, wire connections, or wireless connections.

17. The method of claim 11, further comprising storing the gaming information in a memory device included in the gaming machine, wherein the memory device is removable from the gaming machine.

18. The method of claim 11, wherein the gaming information includes a number of games played, a number of wins, a number of losses, a game event, an amount of money wagered for one or more gaming machines, or a combination thereof.

19. The method of claim 11, wherein the gaming information includes game coding instructions that allow a master gaming controller to present the game to a player on the gaming machine.

20. The method of claim 11, wherein the gaming information includes game configuration information that configures the gaming machine for game play of a particular game.

* * * * *